(12) United States Patent
Lindemann

(10) Patent No.: US 11,792,024 B2
(45) Date of Patent: Oct. 17, 2023

(54) SYSTEM AND METHOD FOR EFFICIENT CHALLENGE-RESPONSE AUTHENTICATION

(71) Applicant: Nok Nok Labs, Inc., San Jose, CA (US)

(72) Inventor: Rolf Lindemann, Steele (DE)

(73) Assignee: Nok Nok Labs, Inc., San Jose, CA (US)

( * ) Notice: Subject to any disclaimer, the term of this patent is extended or adjusted under 35 U.S.C. 154(b) by 397 days.

(21) Appl. No.: 16/369,823

(22) Filed: Mar. 29, 2019

(65) Prior Publication Data

US 2020/0313910 A1 Oct. 1, 2020

(51) Int. Cl.
*H04L 9/32* (2006.01)
*H04L 9/40* (2022.01)
*H04L 9/08* (2006.01)

(52) U.S. Cl.
CPC .......... *H04L 9/3271* (2013.01); *H04L 9/0861* (2013.01); *H04L 9/3247* (2013.01); *H04L 9/3263* (2013.01); *H04L 63/166* (2013.01)

(58) Field of Classification Search
CPC ... H04L 9/0861; H04L 9/0891; H04L 9/3263; H04L 9/3271; H04L 9/3231; H04L 9/3247; H04L 63/18; H04L 63/08; H04L 63/166; H04L 63/0442; H04L 63/0853; H04L 63/0861
USPC ......................................................... 713/171
See application file for complete search history.

(56) References Cited

U.S. PATENT DOCUMENTS

| 5,272,754 | A | 12/1993 | Boerbert et al. |
| 5,280,527 | A | 1/1994 | Gullman et al. |
| 5,588,061 | A | 12/1996 | Ganesan et al. |
| 5,764,789 | A | 6/1998 | Pare, Jr. et al. |
| 5,892,900 | A | 4/1999 | Ginter et al. |

(Continued)

FOREIGN PATENT DOCUMENTS

| AU | 1539501 A | 6/2001 |
| CA | 2933336 A1 | 10/2015 |

(Continued)

OTHER PUBLICATIONS

Raising User Acceptance of Token-based Authentication by Single Sign-On Sandro Wefel and Paul Molitor Institute for Computer Science, Martin-Luther-University Halle-Wittenberg, Halle (Saale), Germany International Journal of Information and Computer Science, 2012, 1: 70-77 (Year: 2012).*

(Continued)

*Primary Examiner* — Benjamin A Kaplan
(74) *Attorney, Agent, or Firm* — NICHOLSON DE VOS WEBSTER & ELLIOTT LLP

(57) ABSTRACT

A system, apparatus, method, and machine-readable medium are described for fast authentication. For example, one embodiment of a system comprises: a local challenge generator of a client apparatus to generate a challenge on a client device using a derivation function; an authentication engine of the client apparatus to generate a challenge response as defined by a specified challenge-response protocol; the authentication engine to transmit the challenge response to a server, and the server to validate the challenge response, at least in part, by determining whether the challenge was generated within a specified time window.

25 Claims, 17 Drawing Sheets

(56) References Cited

U.S. PATENT DOCUMENTS

| | | |
|---|---|---|
| 6,035,406 A | 3/2000 | Moussa et al. |
| 6,088,450 A | 7/2000 | Davis et al. |
| 6,178,511 B1 | 1/2001 | Cohen et al. |
| 6,233,685 B1 | 5/2001 | Smith et al. |
| 6,270,011 B1 | 8/2001 | Gottfried |
| 6,377,691 B1 | 4/2002 | Swift et al. |
| 6,510,236 B1 | 1/2003 | Crane et al. |
| 6,588,812 B1 | 7/2003 | Garcia et al. |
| 6,618,806 B1 | 9/2003 | Brown et al. |
| 6,751,733 B1 | 6/2004 | Nakamura et al. |
| 6,801,998 B1 | 10/2004 | Hanna et al. |
| 6,842,896 B1 | 1/2005 | Redding et al. |
| 6,938,156 B2 | 8/2005 | Wheeler et al. |
| 7,155,035 B2 | 12/2006 | Kondo et al. |
| 7,194,761 B1 | 3/2007 | Champagne |
| 7,194,763 B2 | 3/2007 | Potter et al. |
| 7,263,717 B1 | 8/2007 | Boydstun et al. |
| 7,444,368 B1 | 10/2008 | Wong et al. |
| 7,487,357 B2 | 2/2009 | Smith et al. |
| 7,512,567 B2 | 3/2009 | Bemmel et al. |
| 7,526,649 B2 | 4/2009 | Wiseman et al. |
| 7,698,565 B1 | 4/2010 | Bjorn et al. |
| 7,747,862 B2 | 6/2010 | Ovadia |
| 7,865,937 B1 | 1/2011 | White et al. |
| 7,941,669 B2 | 5/2011 | Foley et al. |
| 8,006,300 B2 * | 8/2011 | Mizrah .............. H04L 63/08 726/20 |
| 8,060,922 B2 | 11/2011 | Crichton et al. |
| 8,132,017 B1 | 3/2012 | Lewis |
| 8,166,531 B2 | 4/2012 | Suzuki |
| 8,185,457 B1 | 5/2012 | Bear et al. |
| 8,245,030 B2 | 8/2012 | Lin |
| 8,284,043 B2 | 10/2012 | Judd et al. |
| 8,291,468 B1 | 10/2012 | Chickering |
| 8,353,016 B1 | 1/2013 | Pravetz et al. |
| 8,359,045 B1 | 1/2013 | Hopkins, III |
| 8,380,637 B2 | 2/2013 | Yerucham |
| 8,412,928 B1 | 4/2013 | Bowness |
| 8,458,465 B1 | 6/2013 | Stern et al. |
| 8,489,506 B2 | 7/2013 | Hammad et al. |
| 8,516,552 B2 | 8/2013 | Raleigh |
| 8,526,607 B2 | 9/2013 | Liu et al. |
| 8,555,340 B2 | 10/2013 | Potter et al. |
| 8,561,152 B2 | 10/2013 | Novak et al. |
| 8,584,219 B1 | 11/2013 | Toole et al. |
| 8,584,224 B1 | 11/2013 | Pei et al. |
| 8,607,048 B2 | 12/2013 | Nogawa |
| 8,646,060 B1 | 2/2014 | Ben |
| 8,713,325 B2 | 4/2014 | Ganesan |
| 8,719,905 B2 | 5/2014 | Ganesan |
| 8,745,698 B1 | 6/2014 | Ashfield et al. |
| 8,776,180 B2 | 7/2014 | Kumar et al. |
| 8,843,997 B1 | 9/2014 | Hare |
| 8,856,541 B1 | 10/2014 | Chaudhury et al. |
| 8,949,978 B1 | 2/2015 | Lin et al. |
| 8,958,599 B1 | 2/2015 | Starner |
| 8,978,117 B2 | 3/2015 | Bentley et al. |
| 9,015,482 B2 | 4/2015 | Baghdasaryan et al. |
| 9,032,485 B2 | 5/2015 | Chu et al. |
| 9,083,689 B2 | 7/2015 | Lindemann et al. |
| 9,118,657 B1 | 8/2015 | Shetty |
| 9,161,209 B1 | 10/2015 | Ghoshal et al. |
| 9,171,306 B1 | 10/2015 | He et al. |
| 9,172,687 B2 | 10/2015 | Baghdasaryan et al. |
| 9,183,023 B2 | 11/2015 | Pires et al. |
| 9,219,732 B2 | 12/2015 | Baghdasaryan et al. |
| 9,306,754 B2 | 4/2016 | Baghdasaryan et al. |
| 9,317,705 B2 | 4/2016 | O'Hare et al. |
| 9,367,678 B2 | 6/2016 | Pal et al. |
| 9,396,320 B2 | 7/2016 | Lindemann |
| 9,521,548 B2 | 12/2016 | Fosmark et al. |
| 9,547,760 B2 | 1/2017 | Kang et al. |
| 9,633,322 B1 | 4/2017 | Burger |
| 9,654,469 B1 | 5/2017 | Yang |
| 9,692,599 B1 | 6/2017 | Krahn |
| 9,698,976 B1 | 7/2017 | Statica et al. |
| 9,754,100 B1 | 9/2017 | Hitchcock et al. |
| 9,886,701 B1 | 2/2018 | Llora et al. |
| 9,887,983 B2 | 2/2018 | Lindemann et al. |
| 10,057,243 B1 | 8/2018 | Kumar et al. |
| 10,091,195 B2 | 10/2018 | Lindemann |
| 10,133,867 B1 | 11/2018 | Brandwine et al. |
| 10,631,164 B2 | 4/2020 | Yang et al. |
| 11,190,504 B1 * | 11/2021 | Ah Kun ................ H04L 9/3247 |
| 2001/0034719 A1 | 10/2001 | Durand et al. |
| 2001/0037451 A1 | 11/2001 | Bhagavatula et al. |
| 2002/0010857 A1 | 1/2002 | Karthik |
| 2002/0016913 A1 | 2/2002 | Wheeler et al. |
| 2002/0037736 A1 | 3/2002 | Kawaguchi et al. |
| 2002/0040344 A1 | 4/2002 | Preiser et al. |
| 2002/0054695 A1 | 5/2002 | Bjorn et al. |
| 2002/0073316 A1 | 6/2002 | Collins et al. |
| 2002/0073320 A1 | 6/2002 | Rinkevich et al. |
| 2002/0082962 A1 | 6/2002 | Farris et al. |
| 2002/0087894 A1 | 7/2002 | Foley et al. |
| 2002/0112157 A1 | 8/2002 | Doyle et al. |
| 2002/0112170 A1 | 8/2002 | Foley et al. |
| 2002/0174344 A1 | 11/2002 | Ting |
| 2002/0174348 A1 | 11/2002 | Ting |
| 2002/0190124 A1 | 12/2002 | Piotrowski |
| 2003/0007645 A1 | 1/2003 | Ofir |
| 2003/0021283 A1 | 1/2003 | See et al. |
| 2003/0035548 A1 | 2/2003 | Kwan |
| 2003/0051171 A1 | 3/2003 | Pearson |
| 2003/0055792 A1 | 3/2003 | Kinoshita et al. |
| 2003/0065805 A1 | 4/2003 | Barnes et al. |
| 2003/0084300 A1 | 5/2003 | Koike |
| 2003/0087629 A1 | 5/2003 | Juitt et al. |
| 2003/0115142 A1 | 6/2003 | Brickell et al. |
| 2003/0135740 A1 | 7/2003 | Talmor et al. |
| 2003/0152252 A1 | 8/2003 | Kondo et al. |
| 2003/0182551 A1 | 9/2003 | Frantz et al. |
| 2003/0226036 A1 | 12/2003 | Bivens et al. |
| 2003/0236991 A1 | 12/2003 | Letsinger |
| 2004/0039909 A1 | 2/2004 | Cheng |
| 2004/0039946 A1 | 2/2004 | Smith et al. |
| 2004/0093372 A1 | 5/2004 | Chen et al. |
| 2004/0101170 A1 | 5/2004 | Tisse et al. |
| 2004/0123153 A1 | 6/2004 | Wright et al. |
| 2004/0243801 A1 | 12/2004 | Chen et al. |
| 2005/0021964 A1 | 1/2005 | Bhatnagar et al. |
| 2005/0080716 A1 | 4/2005 | Belyi et al. |
| 2005/0097320 A1 | 5/2005 | Golan et al. |
| 2005/0100166 A1 | 5/2005 | Smetters et al. |
| 2005/0125295 A1 | 6/2005 | Tidwell et al. |
| 2005/0136979 A1 | 6/2005 | Dietl et al. |
| 2005/0160052 A1 | 7/2005 | Schneider et al. |
| 2005/0187883 A1 | 8/2005 | Bishop et al. |
| 2005/0223217 A1 | 10/2005 | Howard et al. |
| 2005/0223236 A1 | 10/2005 | Yamada et al. |
| 2005/0278253 A1 | 12/2005 | Meek et al. |
| 2006/0026671 A1 | 2/2006 | Potter et al. |
| 2006/0029062 A1 | 2/2006 | Rao et al. |
| 2006/0064582 A1 | 3/2006 | Teal et al. |
| 2006/0101136 A1 | 5/2006 | Akashika et al. |
| 2006/0136727 A1 | 6/2006 | Voss et al. |
| 2006/0149580 A1 | 7/2006 | Helsper et al. |
| 2006/0156385 A1 | 7/2006 | Chiviendacz et al. |
| 2006/0161435 A1 | 7/2006 | Atef et al. |
| 2006/0161672 A1 | 7/2006 | Jolley et al. |
| 2006/0174037 A1 | 8/2006 | Bernardi et al. |
| 2006/0177061 A1 | 8/2006 | Orsini et al. |
| 2006/0195689 A1 | 8/2006 | Blecken et al. |
| 2006/0213978 A1 | 9/2006 | Geller et al. |
| 2006/0242415 A1 | 10/2006 | Gaylor |
| 2006/0256108 A1 | 11/2006 | Scaralata |
| 2006/0282670 A1 | 12/2006 | Karchov |
| 2006/0294390 A1 | 12/2006 | Navratil et al. |
| 2007/0005988 A1 | 1/2007 | Zhang et al. |
| 2007/0038568 A1 | 2/2007 | Greene et al. |
| 2007/0043949 A1 | 2/2007 | Bugbee |
| 2007/0077915 A1 | 4/2007 | Black et al. |
| 2007/0087756 A1 | 4/2007 | Hoffberg |
| 2007/0088950 A1 | 4/2007 | Wheeler et al. |

(56) References Cited

U.S. PATENT DOCUMENTS

| | | |
|---|---|---|
| 2007/0094165 A1 | 4/2007 | Gyorfi et al. |
| 2007/0100756 A1 | 5/2007 | Varma |
| 2007/0101138 A1 | 5/2007 | Camenisch et al. |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0162581 A1 | 7/2007 | Maes |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0180495 A1 | 8/2007 | Hardjono et al. |
| 2007/0198435 A1 | 8/2007 | Siegal et al. |
| 2007/0217590 A1 | 9/2007 | Loupia et al. |
| 2007/0220597 A1 | 9/2007 | Ishida |
| 2007/0234417 A1 | 10/2007 | Blakley, III et al. |
| 2007/0239980 A1 | 10/2007 | Funayama |
| 2007/0278291 A1 | 12/2007 | Rans et al. |
| 2007/0286130 A1 | 12/2007 | Shao et al. |
| 2007/0288380 A1 | 12/2007 | Starrs |
| 2008/0005562 A1 | 1/2008 | Sather et al. |
| 2008/0024302 A1 | 1/2008 | Yoshida |
| 2008/0025234 A1 | 1/2008 | Zhu et al. |
| 2008/0028453 A1 | 1/2008 | Nguyen et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0072054 A1 | 3/2008 | Choi et al. |
| 2008/0086759 A1 | 4/2008 | Colson |
| 2008/0134311 A1 | 6/2008 | Medvinsky et al. |
| 2008/0141339 A1 | 6/2008 | Gomez et al. |
| 2008/0172725 A1 | 7/2008 | Fujii et al. |
| 2008/0184349 A1 | 7/2008 | Ting |
| 2008/0184351 A1 | 7/2008 | Gephart et al. |
| 2008/0189212 A1 | 8/2008 | Kulakowski et al. |
| 2008/0196101 A1 | 8/2008 | Sade et al. |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0289020 A1 | 11/2008 | Cameron et al. |
| 2008/0313719 A1 | 12/2008 | Kaliski, Jr. et al. |
| 2008/0320308 A1 | 12/2008 | Kostiainen et al. |
| 2009/0025084 A1 | 1/2009 | Siourthas et al. |
| 2009/0049510 A1 | 2/2009 | Zhang et al. |
| 2009/0055322 A1 | 2/2009 | Bykov et al. |
| 2009/0064292 A1 | 3/2009 | Carter et al. |
| 2009/0077638 A1 | 3/2009 | Norman et al. |
| 2009/0083850 A1 | 3/2009 | Fadell et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0119221 A1 | 5/2009 | Weston et al. |
| 2009/0133113 A1 | 5/2009 | Schneider |
| 2009/0134972 A1 | 5/2009 | Wu et al. |
| 2009/0138724 A1 | 5/2009 | Chiou et al. |
| 2009/0138727 A1 | 5/2009 | Campello |
| 2009/0158425 A1 | 6/2009 | Chan et al. |
| 2009/0164797 A1 | 6/2009 | Kramer et al. |
| 2009/0183003 A1 | 7/2009 | Haverinen |
| 2009/0187988 A1 | 7/2009 | Hulten et al. |
| 2009/0193508 A1 | 7/2009 | Brenneman et al. |
| 2009/0196418 A1 | 8/2009 | Tkacik et al. |
| 2009/0199264 A1 | 8/2009 | Lang |
| 2009/0204964 A1 | 8/2009 | Foley et al. |
| 2009/0235339 A1 | 9/2009 | Mennes et al. |
| 2009/0240624 A1 | 9/2009 | James et al. |
| 2009/0245507 A1 | 10/2009 | Vuillaume et al. |
| 2009/0271618 A1 | 10/2009 | Camenisch et al. |
| 2009/0271635 A1 | 10/2009 | Liu et al. |
| 2009/0276474 A1 | 11/2009 | Sela et al. |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0323962 A1 | 12/2009 | Aciicmez et al. |
| 2009/0327131 A1 | 12/2009 | Beenau et al. |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0025466 A1 | 2/2010 | Cardone et al. |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0077454 A1 | 3/2010 | Xiao et al. |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0121855 A1 | 5/2010 | Dalia et al. |
| 2010/0150353 A1 | 6/2010 | Bauchot et al. |
| 2010/0169650 A1 | 7/2010 | Brickell et al. |
| 2010/0175116 A1 | 7/2010 | Gum |
| 2010/0186072 A1 | 7/2010 | Kumar |
| 2010/0191612 A1 | 7/2010 | Raleigh |
| 2010/0192209 A1 | 7/2010 | Steeves et al. |
| 2010/0205658 A1 | 8/2010 | Griffin |
| 2010/0211792 A1 | 8/2010 | Ureche et al. |
| 2010/0223663 A1 | 9/2010 | Morimoto et al. |
| 2010/0242088 A1 | 9/2010 | Thomas |
| 2010/0266128 A1 | 10/2010 | Asokan et al. |
| 2010/0287369 A1 | 11/2010 | Monden |
| 2010/0299265 A1 | 11/2010 | Walters et al. |
| 2010/0299738 A1 | 11/2010 | Wahl |
| 2010/0325427 A1 | 12/2010 | Ekberg et al. |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004918 A1 | 1/2011 | Chow et al. |
| 2011/0004933 A1 | 1/2011 | Dickinson et al. |
| 2011/0022835 A1 | 1/2011 | Schibuk |
| 2011/0035788 A1 | 2/2011 | White et al. |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0099361 A1 | 4/2011 | Shah et al. |
| 2011/0099367 A1 | 4/2011 | Thom et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0184838 A1 | 7/2011 | Winters et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. |
| 2011/0225643 A1 | 9/2011 | Faynberg et al. |
| 2011/0228330 A1 | 9/2011 | Nogawa |
| 2011/0231911 A1 | 9/2011 | White et al. |
| 2011/0246756 A1 | 10/2011 | Smith et al. |
| 2011/0246766 A1 | 10/2011 | Orsini et al. |
| 2011/0265159 A1 | 10/2011 | Ronda et al. |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023567 A1 | 1/2012 | Hammad |
| 2012/0023568 A1 | 1/2012 | Cha et al. |
| 2012/0030083 A1 | 2/2012 | Newman et al. |
| 2012/0046012 A1 | 2/2012 | Forutanpour et al. |
| 2012/0047555 A1 | 2/2012 | Xiao et al. |
| 2012/0066757 A1 | 3/2012 | Vysogorets et al. |

(56) References Cited

U.S. PATENT DOCUMENTS

| | | |
|---|---|---|
| 2012/0075062 A1 | 3/2012 | Osman et al. |
| 2012/0084566 A1 | 4/2012 | Chin et al. |
| 2012/0084850 A1 | 4/2012 | Novak et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0130898 A1 | 5/2012 | Snyder et al. |
| 2012/0137137 A1 | 5/2012 | Brickell et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0239950 A1 | 9/2012 | Davis et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0308000 A1 | 12/2012 | Arnold et al. |
| 2012/0313746 A1 | 12/2012 | Rahman et al. |
| 2012/0317297 A1 | 12/2012 | Bailey |
| 2012/0323717 A1 | 12/2012 | Kirsch |
| 2013/0013931 A1 | 1/2013 | O'Hare et al. |
| 2013/0042115 A1 | 2/2013 | Sweet et al. |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0047200 A1 | 2/2013 | Radhakrishnan et al. |
| 2013/0054336 A1 | 2/2013 | Graylin |
| 2013/0054967 A1 | 2/2013 | Davoust et al. |
| 2013/0055370 A1 | 2/2013 | Goldberg et al. |
| 2013/0061055 A1 | 3/2013 | Schibuk |
| 2013/0066832 A1 | 3/2013 | Sheehan et al. |
| 2013/0067546 A1 | 3/2013 | Thavasi et al. |
| 2013/0073859 A1 | 3/2013 | Carlson et al. |
| 2013/0080769 A1 | 3/2013 | Cha et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0124422 A1 | 5/2013 | Hubert |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0139238 A1 | 5/2013 | Ryan |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0160100 A1 | 6/2013 | Langley |
| 2013/0167196 A1 | 6/2013 | Spencer et al. |
| 2013/0191884 A1 | 7/2013 | Leicher et al. |
| 2013/0205360 A1 | 8/2013 | Novak et al. |
| 2013/0212637 A1 | 8/2013 | Guccione et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0239189 A1 | 9/2013 | Ionescu et al. |
| 2013/0246272 A1 | 9/2013 | Kirsch et al. |
| 2013/0247164 A1 | 9/2013 | Hoggan |
| 2013/0262305 A1 | 10/2013 | Jones et al. |
| 2013/0276060 A1 | 10/2013 | Wiedmann et al. |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0326213 A1 | 12/2013 | Murphy et al. |
| 2013/0326215 A1 | 12/2013 | Leggette et al. |
| 2013/0337777 A1 | 12/2013 | Deutsch et al. |
| 2013/0346176 A1 | 12/2013 | Alolabi et al. |
| 2013/0347064 A1 | 12/2013 | Aissi et al. |
| 2014/0002238 A1 | 1/2014 | Taveau et al. |
| 2014/0006776 A1 | 1/2014 | Scott-Nash et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0037092 A1 | 2/2014 | Bhattacharya et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez Martinez et al. |
| 2014/0075516 A1 | 3/2014 | Chermside |
| 2014/0082715 A1 | 3/2014 | Grajek et al. |
| 2014/0086413 A1 | 3/2014 | Matsuda et al. |
| 2014/0089243 A1 | 3/2014 | Oppenheimer |
| 2014/0090039 A1 | 3/2014 | Bhow |
| 2014/0090088 A1 | 3/2014 | Bjones et al. |
| 2014/0096177 A1 | 4/2014 | Smith et al. |
| 2014/0096182 A1 | 4/2014 | Smith |
| 2014/0101439 A1 | 4/2014 | Pettigrew et al. |
| 2014/0108784 A1 | 4/2014 | Pendarakis et al. |
| 2014/0109174 A1 | 4/2014 | Barton et al. |
| 2014/0109200 A1 | 4/2014 | Tootill et al. |
| 2014/0114857 A1 | 4/2014 | Griggs et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0137220 A1 | 5/2014 | Niemela |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0208407 A1 | 7/2014 | Vanblon et al. |
| 2014/0215585 A1 | 7/2014 | Sanaullah et al. |
| 2014/0230032 A1 | 8/2014 | Duncan |
| 2014/0245391 A1 | 8/2014 | Adenuga |
| 2014/0250011 A1 | 9/2014 | Weber |
| 2014/0250511 A1 | 9/2014 | Kendall |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0279516 A1 | 9/2014 | Rellas et al. |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289116 A1 | 9/2014 | Polivanyi et al. |
| 2014/0289117 A1 | 9/2014 | Baghdasaryan |
| 2014/0289509 A1 | 9/2014 | Baghdasaryan |
| 2014/0289820 A1 | 9/2014 | Lindemann et al. |
| 2014/0289821 A1 | 9/2014 | Wilson |
| 2014/0289833 A1 | 9/2014 | Briceno et al. |
| 2014/0289834 A1 | 9/2014 | Lindemann et al. |
| 2014/0298419 A1 | 10/2014 | Boubez et al. |
| 2014/0304505 A1 | 10/2014 | Dawson |
| 2014/0325239 A1 | 10/2014 | Ghose |
| 2014/0333413 A1 | 11/2014 | Kursun et al. |
| 2014/0335824 A1 | 11/2014 | Abraham |
| 2014/0337948 A1 | 11/2014 | Hoyos et al. |
| 2014/0344904 A1 | 11/2014 | Venkataramani et al. |
| 2015/0019220 A1 | 1/2015 | Talhami et al. |
| 2015/0046340 A1 | 2/2015 | Dimmick |
| 2015/0046989 A1 | 2/2015 | Oberheide et al. |
| 2015/0052342 A1 | 2/2015 | Jang et al. |
| 2015/0058931 A1 | 2/2015 | Miu et al. |
| 2015/0072726 A1 | 3/2015 | Stern |
| 2015/0074745 A1 | 3/2015 | Stern et al. |
| 2015/0095999 A1 | 4/2015 | Toth et al. |
| 2015/0096002 A1 | 4/2015 | Shuart et al. |
| 2015/0113618 A1 | 4/2015 | Sinha et al. |
| 2015/0121068 A1 | 4/2015 | Lindemann et al. |
| 2015/0134330 A1 | 5/2015 | Baldwin et al. |

(56) References Cited

U.S. PATENT DOCUMENTS

| | | |
|---|---|---|
| 2015/0142628 A1 | 5/2015 | Suplee et al. |
| 2015/0180869 A1 | 6/2015 | Verma |
| 2015/0193781 A1 | 7/2015 | Dave et al. |
| 2015/0242605 A1 | 8/2015 | Du et al. |
| 2015/0244525 A1 | 8/2015 | McCusker et al. |
| 2015/0244696 A1 | 8/2015 | Ma |
| 2015/0269050 A1 | 9/2015 | Filimonov et al. |
| 2015/0281279 A1 | 10/2015 | Smith et al. |
| 2015/0304110 A1 | 10/2015 | Oberheide et al. |
| 2015/0326529 A1 | 11/2015 | Morita |
| 2015/0334165 A1 | 11/2015 | Arling et al. |
| 2015/0373039 A1 | 12/2015 | Wang |
| 2015/0381580 A1 | 12/2015 | Graham, III et al. |
| 2016/0005032 A1 | 1/2016 | Yau et al. |
| 2016/0034892 A1 | 2/2016 | Carpenter et al. |
| 2016/0036588 A1 | 2/2016 | Thackston |
| 2016/0050193 A1 | 2/2016 | Kanov et al. |
| 2016/0071105 A1 | 3/2016 | Groarke et al. |
| 2016/0072787 A1 | 3/2016 | Balabine et al. |
| 2016/0078869 A1 | 3/2016 | Syrdal et al. |
| 2016/0087952 A1 | 3/2016 | Tartz et al. |
| 2016/0087957 A1 | 3/2016 | Shah et al. |
| 2016/0094543 A1 | 3/2016 | Innes et al. |
| 2016/0098555 A1 | 4/2016 | Mersh et al. |
| 2016/0098562 A1 | 4/2016 | Hawblitzel et al. |
| 2016/0099811 A1 | 4/2016 | Hawblitzel et al. |
| 2016/0134421 A1 | 5/2016 | Chen et al. |
| 2016/0188958 A1 | 6/2016 | Martin |
| 2016/0191499 A1 | 6/2016 | Momchilov et al. |
| 2016/0219043 A1 | 7/2016 | Blanke |
| 2016/0241552 A1 | 8/2016 | Lindemann |
| 2016/0259941 A1 | 9/2016 | Vasudevan et al. |
| 2016/0275461 A1 | 9/2016 | Sprague et al. |
| 2016/0292687 A1 | 10/2016 | Kruglick et al. |
| 2016/0294810 A1 | 10/2016 | Wang et al. |
| 2016/0316365 A1 | 10/2016 | Buhler et al. |
| 2016/0364787 A1 | 12/2016 | Walker et al. |
| 2016/0373257 A1 | 12/2016 | Adrangi et al. |
| 2017/0004291 A1 | 1/2017 | Pathak et al. |
| 2017/0004487 A1 | 1/2017 | Hagen et al. |
| 2017/0011406 A1 | 1/2017 | Tunnell et al. |
| 2017/0013012 A1 | 1/2017 | Hansen |
| 2017/0027008 A1 | 1/2017 | Krishnamoorthy et al. |
| 2017/0032111 A1 | 2/2017 | Johansson et al. |
| 2017/0041147 A1 | 2/2017 | Krahn et al. |
| 2017/0048070 A1 | 2/2017 | Gulati et al. |
| 2017/0085587 A1 | 3/2017 | Turgeman |
| 2017/0103226 A1 | 4/2017 | Eberlein et al. |
| 2017/0109751 A1 | 4/2017 | Dunkelberger et al. |
| 2017/0155513 A1 | 6/2017 | Acar et al. |
| 2017/0195121 A1 | 7/2017 | Frei et al. |
| 2017/0221068 A1 | 8/2017 | Krauss et al. |
| 2017/0249482 A1 | 8/2017 | Takaai et al. |
| 2017/0250972 A1 | 8/2017 | Ronda et al. |
| 2017/0289140 A1 | 10/2017 | Cai et al. |
| 2017/0317833 A1 | 11/2017 | Smith et al. |
| 2017/0330174 A1 | 11/2017 | Demarinis et al. |
| 2017/0330180 A1 | 11/2017 | Song et al. |
| 2017/0331632 A1 | 11/2017 | Leoutsarakos et al. |
| 2017/0352116 A1 | 12/2017 | Pierce et al. |
| 2017/0373844 A1 | 12/2017 | Sykora et al. |
| 2018/0034641 A1 | 2/2018 | Tiwari et al. |
| 2018/0039990 A1 | 2/2018 | Lindemann et al. |
| 2018/0041503 A1 | 2/2018 | Lindemann |
| 2018/0046823 A1 | 2/2018 | Durham et al. |
| 2018/0075231 A1 | 3/2018 | Subramanian et al. |
| 2018/0109538 A1 | 4/2018 | Kumar et al. |
| 2018/0167211 A1 | 6/2018 | Falk et al. |
| 2018/0176195 A1 | 6/2018 | Pangam et al. |
| 2018/0183586 A1 | 6/2018 | Bhargav-Spantzel et al. |
| 2018/0191501 A1 | 7/2018 | Lindemann |
| 2018/0191695 A1 | 7/2018 | Lindemann |
| 2018/0204192 A1 | 7/2018 | Whaley et al. |
| 2018/0204213 A1 | 7/2018 | Zappier et al. |
| 2018/0309567 A1 | 10/2018 | Wooden |
| 2018/0314817 A1 | 11/2018 | Gadde et al. |
| 2018/0323970 A1 | 11/2018 | Maron et al. |
| 2018/0341765 A1 | 11/2018 | Ando |
| 2018/0351941 A1 | 12/2018 | Chhabra |
| 2018/0367310 A1 | 12/2018 | Leong et al. |
| 2018/0375655 A1 | 12/2018 | Thom et al. |
| 2019/0050551 A1 | 2/2019 | Goldman-Kirst et al. |
| 2019/0068568 A1 | 2/2019 | Liderman et al. |
| 2019/0124081 A1* | 4/2019 | Nowak ............ H04L 63/0892 |
| 2019/0139005 A1 | 5/2019 | Piel |
| 2019/0149334 A1 | 5/2019 | Van Der Velden |
| 2019/0156301 A1 | 5/2019 | Bentov et al. |
| 2019/0164156 A1 | 5/2019 | Lindemann |
| 2019/0179806 A1 | 6/2019 | Reinsberg et al. |
| 2019/0190724 A1 | 6/2019 | Sundaresan et al. |
| 2019/0205885 A1 | 7/2019 | Lim et al. |
| 2019/0222424 A1 | 7/2019 | Lindemann |
| 2019/0238598 A1 | 8/2019 | Mohamad et al. |
| 2019/0251234 A1 | 8/2019 | Liu et al. |
| 2019/0253404 A1 | 8/2019 | Briceno et al. |
| 2019/0306169 A1 | 10/2019 | Statia et al. |
| 2019/0327223 A1 | 10/2019 | Kumar et al. |
| 2019/0354397 A1 | 11/2019 | Goel et al. |
| 2019/0384627 A1 | 12/2019 | De et al. |
| 2020/0007530 A1 | 1/2020 | Mohamad et al. |
| 2020/0084042 A1 | 3/2020 | Nelson |
| 2020/0084216 A1 | 3/2020 | North et al. |
| 2020/0092103 A1 | 3/2020 | Zavertnik et al. |
| 2020/0097661 A1 | 3/2020 | Block et al. |
| 2020/0110695 A1 | 4/2020 | Maciel et al. |
| 2020/0111118 A1 | 4/2020 | Patel et al. |
| 2020/0137056 A1* | 4/2020 | Havaralu Rama Chandra Adiga ............ H04L 63/0892 |
| 2020/0167474 A1 | 5/2020 | Goldman et al. |
| 2020/0177563 A1 | 6/2020 | Huapaya et al. |
| 2020/0213297 A1 | 7/2020 | Suraparaju |
| 2020/0351656 A1 | 11/2020 | Johansson et al. |
| 2021/0144551 A1* | 5/2021 | Lee ............ H04W 12/069 |
| 2022/0029812 A1* | 1/2022 | Tamiya ............ H04L 9/3013 |

FOREIGN PATENT DOCUMENTS

| | | |
|---|---|---|
| CN | 1312510 A | 9/2001 |
| CN | 1705923 A | 12/2005 |
| CN | 1705925 A | 12/2005 |
| CN | 1882963 A | 12/2006 |
| CN | 101051908 A | 10/2007 |
| CN | 101101687 A | 1/2008 |
| CN | 101276448 A | 10/2008 |
| CN | 101336436 A | 12/2008 |
| CN | 101394283 A | 3/2009 |
| CN | 101410847 A | 4/2009 |
| CN | 101495956 A | 7/2009 |
| CN | 101636949 A | 1/2010 |
| CN | 101751629 A | 6/2010 |
| CN | 101803272 A | 8/2010 |
| CN | 102077546 A | 5/2011 |
| CN | 102187701 A | 9/2011 |
| CN | 102246455 A | 11/2011 |
| CN | 102255917 A | 11/2011 |
| CN | 102404116 A | 4/2012 |
| CN | 102696212 A | 9/2012 |
| CN | 102713922 A | 10/2012 |
| CN | 102763111 A | 10/2012 |
| CN | 102763114 A | 10/2012 |
| CN | 103220145 A | 7/2013 |
| CN | 103460738 A | 12/2013 |
| CN | 103475666 A | 12/2013 |
| CN | 103793632 A | 5/2014 |
| CN | 103888252 A | 6/2014 |
| CN | 103945374 A | 7/2014 |
| CN | 103999401 A | 8/2014 |
| EP | 1376302 A2 | 1/2004 |
| EP | 2357754 A1 | 8/2011 |
| JP | H06195307 A | 7/1994 |
| JP | H09231172 A | 9/1997 |
| JP | 2001-325469 A | 11/2001 |
| JP | 2002152189 A | 5/2002 |
| JP | 2003143136 A | 5/2003 |

(56) References Cited

FOREIGN PATENT DOCUMENTS

| | | |
|---|---|---|
| JP | 2003-219473 A | 7/2003 |
| JP | 2003223235 A | 8/2003 |
| JP | 2003-274007 A | 9/2003 |
| JP | 2003318894 A | 11/2003 |
| JP | 2004-508619 A | 3/2004 |
| JP | 2004-118456 A | 4/2004 |
| JP | 2004348308 A | 12/2004 |
| JP | 2005092614 A | 4/2005 |
| JP | 2005316936 A | 11/2005 |
| JP | 2006-144421 A | 6/2006 |
| JP | 2007-514333 A | 5/2007 |
| JP | 2007148470 A | 6/2007 |
| JP | 2007220075 A | 8/2007 |
| JP | 2007249726 A | 9/2007 |
| JP | 2008-017301 A | 1/2008 |
| JP | 2008065844 A | 3/2008 |
| JP | 2009-199530 A | 9/2009 |
| JP | 2009223452 A | 10/2009 |
| JP | 2010015263 A | 1/2010 |
| JP | 2010505286 A | 2/2010 |
| JP | 2010-097467 A | 4/2010 |
| JP | 2011-165102 A | 8/2011 |
| JP | 2012503243 A | 2/2012 |
| JP | 4939121 B2 | 5/2012 |
| JP | 2013016070 A | 1/2013 |
| JP | 2013122736 A | 6/2013 |
| JP | 2013522722 A | 6/2013 |
| JP | 2014-524218 A | 9/2014 |
| JP | 2015-511348 A | 4/2015 |
| JP | 2016-521403 A | 7/2016 |
| JP | 2016-208510 A | 12/2016 |
| JP | 2017-152880 A | 8/2017 |
| JP | 2017-157926 A | 9/2017 |
| JP | 2017-528963 A | 9/2017 |
| JP | 2017-535843 A | 11/2017 |
| KR | 10-2008-0075956 A | 8/2008 |
| KR | 10-2011-0122452 A | 11/2011 |
| KR | 10-2012-0136236 A | 12/2012 |
| TW | 200701120 A | 1/2007 |
| TW | 201121280 A | 6/2011 |
| WO | 97/50205 A1 | 12/1997 |
| WO | 03017159 A1 | 2/2003 |
| WO | 2005003985 A1 | 1/2005 |
| WO | 2006/024042 A2 | 3/2006 |
| WO | 2007/004224 A1 | 1/2007 |
| WO | 2007023756 A1 | 3/2007 |
| WO | 2007094165 A1 | 8/2007 |
| WO | 2009158530 A2 | 12/2009 |
| WO | 2010032216 A1 | 3/2010 |
| WO | 2010067433 A1 | 6/2010 |
| WO | 2013082190 A1 | 6/2013 |
| WO | 2014/011997 A1 | 1/2014 |
| WO | 2014105994 A2 | 7/2014 |
| WO | 2015130734 A1 | 9/2015 |
| WO | 2016/019106 A1 | 2/2016 |
| WO | 2017219007 A1 | 12/2017 |

OTHER PUBLICATIONS

Abate A., et al.,"2D and 3D face recognition: A survey," Jan. 2007, Pattern Recognition Letters, pp. 1885-1906.
Advisory Action from U.S. Appl. No. 13/730,791, dated Jan. 23, 2015, 4 pages.
Akhtar Z., et al., "Spoof Attacks on Multimodal Biometric Systems," International Conference on Information and Network Technology, 2011, vol. 4, pp. 46-51.
Babich A., "Biometric Authentication. Types of Biometric Identifiers," Haaga-Helia, University of Applied Sciences, 2012, retrieved from https://www.theseus.fi/bitstream/handle/10024/44684/Babich_Aleksandra.pdf, 56 pages.
Bao W., et al., "A liveness detection method for face recognition based on optical flow field", 2009, pp. 233-236, http://ieeexplore.ieee.org/stamp/stamp.jsp?tp=&arnumber=5054589&isnumber=5054562.
Barker E., et al., "Recommendation for key management Part 3: Application-Specific Key Management Guidance," NIST Special Publication 800-57, Dec. 2009, pp. 1-103.
Behaviosec, "Measuring FAR/FRR/EER in Continuous Authentication," Stockholm, Sweden (2009), 8 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359-0/11.
Chen L., "Direct Anonymous Attestation," Oct. 12, 2005, retrieved from https://trustedcomputinggroup.org/wp-content/uploads/051012_DAA-slides.pdf on Apr. 2, 2018, 27 pages.
Chen L., et al., "Flexible and scalable digital signatures in TPM 2.0." Proceedings of the 2013 ACM SIGSAC conference on Computer & communications security. ACM, 2013, 12 pages.
Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Communication pursuant to Article 94(3) EPC for Application No. 15786796.1, dated Oct. 23, 2018, 4 pages.
Communication Pursuant to Article 94(3) EPC for Application No. 15828152.7, dated Jan. 31, 2019, 7 pages.
Communication pursuant to Article 94(3) EPC for Application No. 15841530.7, dated Feb. 8, 2019, 4 pages.
Communication pursuant to Rules 161(2) and 162 EPC for EP Application No. 15826364.0, dated Mar. 7, 2017, 2 pages.
Communication Pursuant to Rules 70(2) and 70a(2) EPC for European Application No. 15786487.7, dated Nov. 9, 2017, 1 page.
Communication Pursuant to Rules 70(2) and 70a(2) EPC for European Application No. 15827363.7, dated Mar. 13, 2018, 1 page.
Corrected Notice of Allowance from U.S. Appl. No. 15/396,452, dated Aug. 30, 2018, 17 pages.
Corrected Notice of Allowance from U.S. Appl. No. 14/066,273, dated Feb. 8, 2018, 4 pages.
Corrected Notice of Allowance from U.S. Appl. No. 15/396,454, dated Sep. 28, 2018, 24 pages.
Corrected Notice of Allowance from U.S. Appl. No. 14/218,575, dated Jun. 24, 2019, 16 pages.
Crazy Egg Heatmap Shows Where People Click on Your Website, 2012, 3 pages, www.michaelhartzell.com/Blog/bid/92970/Crazy-Egg-Heatmap-shows-where-people-click-on-your-website).
Dawei Zhang; Peng Hu, "Trusted e-commerce user agent based on USB Key", Proceedings of the International MultiConference of Engineers and Computer Scientists 2008 Vol. I, IMECS 2008, Mar. 19-21, 2008, Hong Kong, 7 pages.
Decision to Grant a Patent from counterpart Japanese Patent Application No. 2016-516743 dated Jan. 10, 2019, 5 pages.
Decision to Grant from foreign counterpart Japanese Patent Application No. 2015-550778, dated Jul. 25, 2018, 6 pages.
Delac K. et al., Eds., "Image Compression in Face Recognition a Literature Survey," InTech, Jun. 1, 2008, ISBN 978-953-7619-34-3, Uploaded as individual Chapters 1-15, downloaded from https://www.intechopen.com/books/recent_advances_in_face_recognition/image_compression_in_face_recognition_-_a_literature_survey, 15 pages.
Extended European Search Report for U.S. Appl. No. 13/867,269, dated Nov. 4, 2016, 10 pages.
Extended European Search Report for Application No. 14803988.6, dated Dec. 23, 2016, 10 pages.
Extended European Search Report for Application No. 15786487.7, dated Oct. 23, 2017, 8 pages.
Extended European Search Report for Application No. 15786796.1, dated Nov. 3, 2017, 9 pages.
Extended European Search Report for Application No. 15826364.0, dated Feb. 20, 2018, 6 pages.
Extended European Search Report for Application No. 15826660.1, dated Nov. 16, 2017, 9 pages.

(56) References Cited

OTHER PUBLICATIONS

Extended European Search Report for Application No. 15827334.2, dated Nov. 17, 2017, 8 pages.
Extended European Search Report for Application No. 15827363.1, dated Feb. 22, 2018, 7 pages.
Extended European Search Report for Application No. 15828152.7, dated Feb. 20, 2018, 8 pages.
Extended European Search Report for Application No. 15841530.7, dated Mar. 26, 2018, 8 pages.
Extended European Search Report from European Patent Application No. 14770682.4, dated Jan. 17, 2017, 14 pages.
Final Office Action from U.S. Appl. No. 14/145,466, dated Nov. 20, 2018, 28 pages.
Final Office Action from U.S. Appl. No. 14/218,677, dated May 31, 2018, 16 pages.
Final Office Action from U.S. Appl. No. 14/218,677, dated Jun. 10, 2019, 15 pages.
Final Office Action from U.S. Appl. No. 14/268,563, dated Dec. 27, 2018, 47 pages.
Final Office Action from U.S. Appl. No. 15/229,254, dated Aug. 23, 2018, 16 pages.
Final Office Action from U.S. Appl. No. 13/730,761, dated Jan. 15, 2015, 31 pages.
Final Office Action from U.S. Appl. No. 13/730,761, dated Jul. 8, 2014, 36 pages.
Final Office Action from U.S. Appl. No. 13/730,776, dated Nov. 3, 2014, 20 pages.
Final Office Action from U.S. Appl. No. 13/730,780, dated Jan. 27, 2015, 30 pages.
Final Office Action from U.S. Appl. No. 13/730,780, dated May 12, 2014, 34 pages.
Final Office Action from U.S. Appl. No. 13/730,791, dated Nov. 13, 2014, 22 pages.
Final Office Action from U.S. Appl. No. 13/730,795, dated Aug. 14, 2014, 20 pages.
FC 2560: Myers M., et al., "The Online Certificate Status Protocol, OCSP," Network working group, Jun. 1999, RFC 2560, 22 pages.
RFC 6063:Doherty, et al., "Dynamic Symmetric Key Provisioning Protocol (DSKPP)," Dec. 2010, 105 pages, Internet Engineering Task Force (IETF), Request for Comments : 6063.
RFC 6749: Hardt D, "The OAuth 2.0 Authorization Framework," Internet Engineering Task Force(IETF), Request for Comments: 6749, retrieved from https://tools.ietf.org/pdf/rfc6749.pdf, Oct. 2012, pp. 1-76.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverviewEUSIPC004.pdf.
Saito T, "Mastering TCP/IP, Information Security," Ohmsha Ltd, Sep. 1, 2013, pp. 77-80 (7 Pages).
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz et al., "Face Spoofing Detection Through Partial Least Squares and Low-Level Descriptors," International Conference on Biometrics, 2011, vol. 2011, pp. 1-8.
Smiatacz M., et al., Gdansk University of Technology. Liveness Measurements Using Optical Flow for Biometric Person Authentication. Metrology and Measurement Systems. 2012, vol. XIX, 2. pp. 257-268.
Starnberger G., et al., "QR-TAN: Secure Mobile Transaction Authentication," Availability, Reliability and Security, 2009, ARES'09, International Conference on IEEE, Mar. 16, 2009, pp. 578-583.
Supplementary Partial European Search Report for Application No. 13867269, dated Aug. 3, 2016, 7 pages.
T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan et al., "Face Liveness Detection from a Single Image with Sparse Low Rank Bilinear Discriminative Model," European Conference on Computer Vision, 2010, vol. 2010, pp. 1-14.
TechTarget, "What is network perimeter? Definition from WhatIs.com", downloaded from http://searchnetworking.techtarget.com/definition/network-perimeter on Jun. 14, 2018, 3 pages.
The Extended M2VTS Database, [Online] [Cited: Sep. 29, 2012] downloaded from http://www.ee.surrey.ac.uk/CVSSP/xm2vtsdb/ on Jan. 28, 2015, 1 page.
Transmittal of International Preliminary Report On Patentability from foreign counterpart PCT Patent Application No. PCT/US2014/031344 dated Oct. 1, 2015, 9 pages.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadem_PervComp2012draft.pdf.
Tronci R., et al., "Fusion of Multiple Clues for Photo-Attack Detection in Face Recognition Systems," International Joint Conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Uymatiao M.L.T., et al., "Time-based OTP authentication via secure tunnel (TOAST); A mobile TOTP scheme using TLS seed exchange and encrypted offline keystore," 2014 4th IEEE International Conference on Information Science and Technology, IEEE, Apr. 26, 2014, pp. 225-229.
Validity, OSTP Framework, 24 pages, 2010.
Vassilev, A.T.; du Castel, B.; Ali, A.M., "Personal Brokerage of Web Service Access," Security & Privacy, IEEE , vol. 5, No. 5, pp. 24-31, Sep.-Oct. 2007.
Watanabe H., et al., "The Virtual Wearable Computing System Assumed Widely Movement," the multimedia, distribution and cooperation which were taken into consideration, mobile (DICOM02009) symposium collected-papers [CD-ROM], Japan, Information Processing Society of Japan, Jul. 1, 2009, and vol. 2009 (1), pp. 1406-1414. (Abstract only in English).
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How To Trick Google's New Face Unlock On Android 4.1 Jelly Bean," Aug. 6, 2012, 5 pages, [online], [retrieved Aug. 13, 2015]. Retrieved from the Internet:URL: http://printscreenmac.info/how-to-trick-android-jelly-bean-faceunlock/.
World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.

(56) References Cited

OTHER PUBLICATIONS

Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.
Non-Final Office Action from U.S. Appl. No. 14/066,273 dated Jun. 16, 2016, 43 pages.
Non-Final Office Action from U.S. Appl. No. 14/066,273 dated May 8, 2015, 31 pages.
Non-Final Office Action from U.S. Appl. No. 14/066,273, dated May 18, 2017, 46 pages.
Non-Final Office Action from U.S. Appl. No. 14/066,384 dated Jan. 7, 2015, 24 pages.
Non-Final Office Action from U.S. Appl. No. 14/066,384 dated Mar. 17, 2016, 40 pages.
Non-Final Office Action from U.S. Appl. No. 14/145,439 dated Feb. 12, 2015, 18 pages.
Non-Final Office Action from U.S. Appl. No. 14/145,466 dated Sep. 9, 2016, 13 pages.
Non-Final Office Action from U.S. Appl. No. 14/145,533 dated Jan. 26, 2015, 13 pages.
Non-Final Office Action from U.S. Appl. No. 14/145,607 dated Mar. 20, 2015, 22 pages.
Non-Final Office Action from U.S. Appl. No. 14/218,504, dated Feb. 27, 2017, 12 pages.
Non-Final Office Action from U.S. Appl. No. 14/218,551 dated Apr. 23, 2015, 9 pages.
Non-Final Office Action from U.S. Appl. No. 14/218,551 dated Jan. 21, 2016, 11 pages.
Non-Final Office Action from U.S. Appl. No. 14/218,551 dated May 12, 2016, 11 pages.
Non-Final Office Action from U.S. Appl. No. 14/218,575 dated Feb. 10, 2015, 17 pages.
Non-Final Office Action from U.S. Appl. No. 14/218,575 dated Jan. 29, 2016, 25 pages.
Non-Final Office Action from U.S. Appl. No. 14/218,575, dated Mar. 8, 2018, 29 pages.
Non-Final Office Action from U.S. Appl. No. 14/218,575, dated May 4, 2017, 88 pages.
Non-Final Office Action from U.S. Appl. No. 14/218,611, dated Feb. 7, 2019, 27 pages.
Non-Final Office Action from U.S. Appl. No. 14/218,611 dated Jun. 16, 2016, 13 pages.
Non-Final Office Action from U.S. Appl. No. 14/218,611, dated Sep. 19, 2017, 76 pages.
Non-Final Office Action from U.S. Appl. No. 14/218,646, dated Mar. 7, 2018, 32 pages.
Non-Final Office Action from U.S. Appl. No. 14/218,646, dated Mar. 10, 2016, 23 pages.
Non-Final Office Action from U.S. Appl. No. 14/218,646, dated Mar. 27, 2017, 24 pages.
Non-Final Office Action from U.S. Appl. No. 14/218,677 dated Aug. 2, 2016, 15 pages.
Non-Final Office Action from U.S. Appl. No. 14/218,677, dated Feb. 2, 2018, 25 pages.
Non-Final Office Action from U.S. Appl. No. 14/218,677, dated Feb. 10, 2017, 18 pages.
Non-Final Office Action from U.S. Appl. No. 14/218,692 dated Nov. 4, 2015, 16 pages.
Non-Final Office Action from U.S. Appl. No. 14/218,692 dated Oct. 25, 2016, 33 pages.
Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/218,743, dated Aug. 19, 2016, 11 pages.
Non-Final Office Action from U.S. Appl. No. 14/218,743 dated Jan. 21, 2016, 12 pages.
Non-Final Office Action from U.S. Appl. No. 14/268,563, dated Apr. 21, 2017, 83 pages.
Non-Final Office Action from U.S. Appl. No. 14/268,563, dated May 13, 2019, 47 pages.
Non-Final Office Action from U.S. Appl. No. 14/268,619 dated Aug. 24, 2015, 17 pages.
Non-Final Office Action from U.S. Appl. No. 14/268,619 dated Mar. 21, 2016, 7 pages.
Non-Final Office Action from U.S. Appl. No. 14/268,733 dated Jul. 16, 2015, 13 pages.
Non-Final Office Action from U.S. Appl. No. 14/448,641 dated Nov. 9, 2015, 21 pages.
Non-Final Office Action from U.S. Appl. No. 14/448,747 dated Aug. 19, 2016, 21 pages.
Non-Final Office Action from U.S. Appl. No. 14/448,814, dated Apr. 5, 2017, 57 pages.
Non-Final Office Action from U.S. Appl. No. 14/448,814 dated Aug. 4, 2015, 13 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328, dated Jul. 14, 2017, 29 pages.
Non-Final Office Action from U.S. Appl. No. 14/859,328, dated Sep. 15, 2016, 39 pages.
Non-Final Office Action from U.S. Appl. No. 15/229,233, dated Apr. 18, 2019, 87 pages.
Non-Final Office Action from U.S. Appl. No. 15/229,254, dated Feb. 14, 2018, 75 pages.
Non-Final Office Action from U.S. Appl. No. 15/229,254, dated Feb. 26, 2019, 46 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 09 pages.
Communication pursuant to Article 94(3) EPC, EP App. No. 14803988.6, dated Aug. 10, 2020, 7 pages.
Corrected Notice of Allowability, U.S. Appl. No. 15/229,233, dated Jul. 29, 2020, 3 pages.
Corrected Notice of Allowability, U.S. Appl. No. 15/881,522, dated Aug. 26, 2020, 2 pages.
Decision to Grant a Patent, EP App. No. 15828152.7, dated Aug. 13, 2020, 2 pages.
Decision to Refuse, EP App. No. 15827334.2, dated Jul. 2, 2020, 17 pages.
International Preliminary Report on Patentability, PCT App. No. PCT/US2019/013199, dated Jul. 23, 2020, 11 pages.
Office Action, JP App. No. 2017-505513, dated Aug. 3, 2020, 9 pages (5 pages of English Translation and 4 pages of Original Document).
Biryukov et al., "Argon2: the memory-hard function for password hashing and other applications", Version 1.2.1 of Argon2: PHC release, Dec. 26, 2015, pp. 1-18.
Communication pursuant to Article 94(3) EPC, EP App. No. 14770682.4, dated Jul. 7, 2020, 4 pages.
Corrected Notice of Allowability, U.S. Appl. No. 14/218,646, dated Jul. 8, 2020, 5 pages.
Corrected Notice of Allowability, U.S. Appl. No. 15/229,233, dated Jun. 30, 2020, 3 pages.
Corrected Notice of Allowability, U.S. Appl. No. 15/881,522, dated Jul. 13, 2020, 2 pages.
Corrected Notice of Allowability, U.S. Appl. No. 15/881,522, dated Jun. 17, 2020, 2 pages.
Decision to Grant a Patent, EP App. No. 15826364.0, dated Jul. 2, 2020, 2 pages.
First Office Action, CN App. No. 201580041803.4, dated Apr. 23, 2020, 13 pages (5 pages of English Translation and 8 pages of Original Document).
Intention to Grant, EP App. No. 15786796.1, dated Jun. 5, 2020, 6 pages.
International Search Report and Written Opinion, PCT App. No. PCT/US2020/022944, dated Jun. 18, 2020, 12 pages.

(56) References Cited

OTHER PUBLICATIONS

Notice of Allowance, U.S. Appl. No. 15/881,522, dated Jul. 27, 2020, 2 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
International Preliminary Report on Patentability for Application No. PCT/US2017/045534, dated Feb. 14, 2019, 11 pages.
International Search Report and Written Opinion for Application No. PCT/US13/77888, dated Aug. 4, 2014, 10 pages.
International Search Report and Written Opinion for Application No. PCT/US2015/028924 dated Jul. 30, 2015, 10 pages.
International Search Report and Written Opinion for Application No. PCT/US2015/042786, dated Oct. 16, 2015, 8 pages.
International Search Report and Written Opinion for Application No. PCT/US2015/042799, dated Oct. 16, 2015, 8 pages.
International Search Report and Written Opinion for Application No. PCT/US2015/042870, dated Oct. 30, 2015, 9 pages.
International Search Report and Written Opinion for Application No. PCT/US2015/050348, dated Dec. 22, 2015, 9 pages.
International Search Report and Written Opinion for Application No. PCT/US2015/42783, dated Oct. 19, 2015, 13 pages.
International Search Report and Written Opinion for Application No. PCT/US2015/42827, dated Oct. 30, 2015, 9 pages.
International Search Report and Written Opinion for Application No. PCT/US2017/045534, dated Nov. 27, 2017, 14 pages.
International Search Report and Written Opinion for Application No. PCT/US2019/013199, dated Apr. 1, 2019, 12 pages.
International Search Report and Written Opinion for PCT Application No. PCT/US2018/062608, dated Mar. 28, 2019, 12 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," 2011 IEEE 10th International Conference on Trust Security and Privacy in Computing and Communications (TRUSTCOM), Nov. 16, 2011, pp. 436-442.
Kim et al., "Secure User Authentication based on the Trusted Platform for Mobile Devices," EURASIP Journal on Wireless Communications and Networking, Sep. 29, 2016, pp. 1-15.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Linux.com, "The source for Linux information," 2012, 3 pages, downloaded from http://www.linux.com/ on Jan. 28, 2015.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition—Livdet 2009," Image Analysis and Processing—ICIAP, Springer Berlin Heidelberg, 2009. pp. 12-23.
Martins R A., et al., "A Potpourri of Authentication Mechanisms the Mobile Device Way," CISTI, Jan. 2013, pp. 843-848.
Mobile Device Security Using Transient Authentication, IEEE Transactions on Mobile Computing, 2006, vol. 5 (11), pp. 1489-1502.
Monden A., et al., "Remote Authentication Protocol," Multimedia, Distributed, Cooperative and Mobile Symposium (DICOM02007), Information Processing Society of Japan, Jun. 29, 2007, pp. 1322-1331.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob, useit.com. Jakob Nielsen's Alertbox—Scrolling and Attention. [Online] Mar. 22, 2010. [Cited Nov. 1, 2012.] 6 pages. http://www.useit.com/alertbox/scrolling-attention.html.
Niinuma K., et al., "Continuous User Authentication Using Temporal Information," Apr. 2010, http://www.cse.msu.edu/biometrics/Publications/Face/NiinumaJain_ContinuousAuth_SPIE10.pdf, 11 pages.
Non-Final Office Action from U.S. Appl. No. 14/218,646, dated Dec. 31, 2018, 42 pages.
Non-Final Office Action from U.S. Appl. No. 14/218,677, dated Dec. 26, 2018, 32 pages.
Non-Final Office Action from U.S. Appl. No. 14/218,692, dated Jul. 31, 2018, 40 pages.
Non-Final Office Action from U.S. Appl. No. 14/145,466, dated May 11, 2018, 33 pages.
Non-Final Office Action from U.S. Appl. No. 14/268,563, dated Jun. 28, 2018, 56 pages.
Non-Final Office Action from U.S. Appl. No. 15/881,522, dated Jun. 6, 2018, 87 pages.
Non-Final Office Action from U.S. Appl. No. 15/900,620, dated Oct. 19, 2018, 66 pages.
Non-Final Office Action from U.S. Appl. No. 13/730,761, dated Feb. 27, 2014, 24 pages.
Non-Final Office Action from U.S. Appl. No. 13/730,761, dated Sep. 9, 2014, 36 pages.
Non-Final Office Action from U.S. Appl. No. 13/730,776, dated Jul. 15, 2014, 16 pages.
Non-Final Office Action from U.S. Appl. No. 13/730,780, dated Aug. 4, 2014, 30 pages.
Non-Final Office Action from U.S. Appl. No. 13/730,780, dated Mar. 12, 2014, 22 pages.
Non-Final Office Action from U.S. Appl. No. 13/730,791, dated Jun. 27, 2014, 17 pages.
Non-Final Office Action from U.S. Appl. No. 13/730,795, dated Jan. 5, 2015, 19 pages.
Non-Final Office Action from U.S. Appl. No. 13/730,795, dated Jun. 11, 2014, 14 pages.
Non-Final Office Action from U.S. Appl. No. 15/595,460, dated May 3, 2018, 20 pages.
Non-Final Office Action from U.S. Appl. No. 15/954,188, dated Sep. 7, 2018, 41 pages.
Notice of Allowance from U.S. Appl. No. 15/396,454, dated Jan. 28, 2019, 23 pages.
Notice of Allowance from U.S. Appl. No. 15/396,454, dated Nov. 16, 2018, 34 pages.
Notice of Allowance from foreign counterpart Chinese Patent Application No. 201480031042.X, dated Jul. 23, 2018, 5 pages.
Notice of Allowance from foreign counterpart Taiwan Patent Application No. 106125986, dated Jul. 6, 2018, 7 pages.
Notice of Allowance from U.S. Appl. No. 14/218,743, dated Aug. 1, 2018, 18 pages.
Notice of Allowance from U.S. Appl. No. 14/448,814, dated May 9, 2018, 42 pages.

(56) References Cited

OTHER PUBLICATIONS

Notice of Allowance from U.S. Appl. No. 15/396,452, dated Jul. 2, 2018, 23 pages.
Notice of Allowance from U.S. Appl. No. 14/487,992, dated May 12, 2016, 11 pages.
Notice of Allowance from U.S. Appl. No. 13/730,761, dated Jun. 10, 2015, 15 pages.
Notice of Allowance from U.S. Appl. No. 13/730,761, dated Sep. 28, 2015, 5 pages.
Notice of Allowance from U.S. Appl. No. 13/730,776, dated Feb. 13, 2015, 16 pages.
Notice of Allowance from U.S. Appl. No. 13/730,776, dated Mar. 24, 2015, 3 pages.
Notice of Allowance from U.S. Appl. No. 13/730,780, dated Aug. 13, 2015, 13 pages.
Notice of Allowance from U.S. Appl. No. 13/730,791, dated Mar. 10, 2015, 17 pages.
Notice of Allowance from U.S. Appl. No. 13/730,795, dated Jan. 14, 2016, 11 pages.
Notice of Allowance from U.S. Appl. No. 13/730,795, dated May 15, 2015, 8 pages.
Notice of Allowance from U.S. Appl. No. 13/730,795, dated Sep. 17, 2015, 11 pages.
Notice of Allowance from U.S. Appl. No. 14/066,273, dated Jan. 18, 2018, 26 pages.
Notice of Allowance from U.S. Appl. No. 14/066,384 dated Sep. 27, 2016, 19 pages.
Notice of Allowance from U.S. Appl. No. 14/066,384, dated Dec. 1, 2017, 23 pages.
Notice of Allowance from U.S. Appl. No. 14/066,384, dated Jul. 26, 2017, 20 pages.
Notice of Allowance from U.S. Appl. No. 14/066,384, dated May 23, 2017, 50 pages.
Notice of Allowance from U.S. Appl. No. 14/145,439 dated Jul. 6, 2015, 6 pages.
Notice of Allowance from U.S. Appl. No. 14/145,439 dated Mar. 14, 2016, 17 pages.
Notice of Allowance from U.S. Appl. No. 14/145,439 dated Oct. 28, 2015, 12 pages.
Notice of Allowance from U.S. Appl. No. 14/145,533 dated Jan. 20, 2016, 12 pages.
Notice of Allowance from U.S. Appl. No. 14/145,533 dated May 11, 2015, 5 pages.
Notice of Allowance from U.S. Appl. No. 14/145,533 dated Sep. 14, 2015, 13 pages.
Notice of Allowance from U.S. Appl. No. 14/145,607 dated Feb. 1, 2016, 28 pages.
Notice of Allowance from U.S. Appl. No. 14/145,607 dated Sep. 2, 2015, 19 pages.
Notice of Allowance from U.S. Appl. No. 14/218,504, dated May 31, 2018, 95 pages.
Notice of Allowance from U.S. Appl. No. 14/218,551, dated Aug. 16, 2017, 24 pages.
Notice of Allowance from U.S. Appl. No. 14/218,551, dated Dec. 13, 2017, 13 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/218,575, dated Apr. 10, 2019, 32 pages.
Notice of Allowance from U.S. Appl. No. 14/218,692, dated Dec. 5, 2018, 13 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,686 dated Mar. 30, 2016, 38 pages.
Notice of Allowance from U.S. Appl. No. 14/268,686 dated Nov. 5, 2015, 23 pages.
Notice of Allowance from U.S. Appl. No. 14/268,733 dated Sep. 23, 2016, 8 pages.
Notice of Allowance from U.S. Appl. No. 14/268,733, dated Jan. 20, 2017, 62 pages.
Notice of Allowance from U.S. Appl. No. 14/448,641 dated Jun. 7, 2016, 13 pages.
Notice of Allowance from U.S. Appl. No. 14/448,697 dated Jan. 14, 2016, 23 pages.
Notice of Allowance from U.S. Appl. No. 14/448,697 dated May 20, 2016, 14 pages.
Communication pursuant to Article 94(3) EPC, EP App No. 13867269.6, dated Aug. 30, 2019, 6 pages.
Communication Pursuant to Article 94(3) EPC, EP App. No. 14770682.4, dated Jun. 6, 2019, 5 pages.
Communication pursuant to Article 94(3) EPC, EP App. No. 15786796.1, dated May 31, 2019, 5 pages.
Communication pursuant to Article 94(3) EPC, EP App. No. 15826660.1, dated Jul. 4, 2019, 6 pages.
Communication Pursuant to Article 94(3) EPC, EP App. No. 15827334.2, dated Apr. 30, 2019, 9 pages.
Communication pursuant to Article 94(3)EPC, EP. App. No. 14803988.6, dated Oct. 25, 2019, 5 pages.
Final Office Action, U.S. Appl. No. 14/218,611, dated Aug. 2, 2019, 26 pages.
Final Office Action, U.S. Appl. No. 14/268,563, dated Nov. 8, 2019, 36 pages.
Final Office Action, U.S. Appl. No. 15/229,233, dated Sep. 24, 2019, 18 pages.
First Office Action and Search Report, CN App. No. 201580040813.6, dated Jun. 28, 2019, 19 pages.
First Office Action and Search Report, CN App. No. 201580040814, dated Jul. 10, 2019, 10 pages (Translation available only for the office action).
Hebbes L., et al., "2-Factor Authentication with 2D Barcodes," Proceedings of the Fifth International Symposium on Human Aspects of Information Security & Assurance (HAISA 2011), 2011, pp. 86-96.
IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.
IEEE Std 802.11-2012: "Part 11: Wireless LAN Medium Access Control (MAC) and Physical Layer (PHY) Specifications," IEEE Standard for Information technology—Telecommunicationsand information exchange between systems, Local and metropolitan area networks—Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunicationsand information exchange between systems, Local and metropolitan area networks—Specific requirements, Dec. 18, 2013, 425 pages.
Non-Final Office Action, U.S. Appl. No. 14/218,677, dated Oct. 30, 2019, 5 pages.
Non-Final Office Action, U.S. Appl. No. 15/881,522, dated Jul. 16, 2019, 39 pages.
Notice of Abandonment, U.S. Appl. No. 16/209,838, dated Sep. 4, 2019, 2 pages.
Notice of Allowance, TW App. No. 102148853, dated Jul. 6, 2017, 3 pages.
Notice of Allowance, U.S. Appl. No. 14/218,646, dated Sep. 5, 2019, 6 pages.
Notice of Allowance, U.S. Appl. No. 15/229,254, dated Sep. 11, 2019, 8 pages.

(56) References Cited

OTHER PUBLICATIONS

Notice of Reasons for Refusal, JP App. No. 2018-153218, dated Jun. 5, 2019, 7 pages.
Notification to Grant Patent Right for Invention, CN App. No. 201580021972, dated Jul. 16, 2019, 4 pages.
Office Action and Search Report, TW App. No. 107127837, dated Jun. 26, 2019, 4 pages.
Rejection Judgment, JP App. No. 2017-505513, Jun. 17, 2019, 4 pages.
Requirement for Restriction/Election, U.S. Appl. No. 15/822,531, dated Oct. 16, 2019, 6 pages.
Schmidt et al., "Trusted Platform Validation and Management," International Journal of Dependable and Trustworthy Information Systems, vol. 1, No. 2, Apr.-Jun. 2010, pp. 1-31.
Theuner et al., "Analysis of Advertising Effectiveness with Eye Tracking", Department of Marketing, Ludwigshafen University of Applied Science, Proceedings of Measuring Behavior 2008, 2008, 2 pages.
Corrected Notice of Allowability, U.S. Appl. No. 15/881,522, dated Sep. 9, 2020, 2 pages.
Decision to Grant, EP App. No. 15826660.1, dated Sep. 3, 2020, 2 pages.
Non Final Office Action, U.S. Appl. No. 15/822,531, dated Sep. 9, 2020, 23 pages.
Notification to Grant Patent Right for Invention, CN App. No 201580049696.X, dated Sep. 2, 2020, 4 pages (2 pages of English Translation and 2 pages of Original Document).
Requirement for Restriction/Election, U.S. Appl. No. 16/392,301, dated Sep. 14, 2020, 13 pages.
Third Office Action, CN App. No. 201580040813.6, dated Aug. 28, 2020, 10 pages (5 pages of English Translation and 5 pages of Original Document).
Final Office Action from U.S. Appl. No. 14/066,273 dated Feb. 11, 2016, 29 pages.
Final Office Action from U.S. Appl. No. 14/066,273, dated Jan. 10, 2017, 24 pages.
Final Office Action from U.S. Appl. No. 14/066,273, dated Sep. 8, 2017, 30 pages.
Final Office Action from U.S. Appl. No. 14/066,384 dated Aug. 20, 2015, 23 pages.
Final Office Action from U.S. Appl. No. 14/145,466, dated Apr. 13, 2017, 61 pages.
Final Office Action from U.S. Appl. No. 14/218,504, dated Sep. 12, 2017, 83 pages.
Final Office Action from U.S. Appl. No. 14/218,551 dated Sep. 9, 2015, 15 pages.
Final Office Action from U.S. Appl. No. 14/218,551 dated Sep. 16, 2016, 11 pages.
Final Office Action from U.S. Appl. No. 14/218,575 dated Aug. 7, 2015, 19 pages.
Final Office Action from U.S. Appl. No. 14/218,575 dated Jul. 7, 2016, 29 pages.
Final Office Action from U.S. Appl. No. 14/218,575, dated Jul. 31, 2017, 42 pages.
Final Office Action from U.S. Appl. No. 14/218,575 dated Sep. 5, 2018, 19 pages.
Final Office Action from U.S. Appl. No. 14/218,611, dated Jan. 27, 2017, 14 pages.
Final Office Action from U.S. Appl. No. 14/218,611, dated May 3, 2018, 20 pages.
Final Office Action from U.S. Appl. No. 14/218,646, dated Aug. 9, 2018, 23 pages.
Final Office Action from U.S. Appl. No. 14/218,646 dated Aug. 11, 2016, 25 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/218,692, dated Apr. 17, 2018, 99 pages.
Final Office Action from U.S. Appl. No. 14/218,692, dated Feb. 28, 2017, 27 pages.
Final Office Action from U.S. Appl. No. 14/218,692 dated Mar. 2, 2016, 24 pages.
Final Office Action from U.S. Appl. No. 14/218,743, dated Feb. 7, 2018, 27 pages.
Final Office Action from U.S. Appl. No. 14/218,743, dated Mar. 3, 2017, 67 pages.
Final Office Action from U.S. Appl. No. 14/268,563, dated Nov. 3, 2017, 46 pages.
Final Office Action from U.S. Appl. No. 14/268,619 dated Dec. 14, 2015, 10 pages.
Final Office Action from U.S. Appl. No. 14/268,733 dated Jan. 15, 2016, 14 pages.
Final Office Action from U.S. Appl. No. 14/448,747, dated Feb. 13, 2017, 74 pages.
Final Office Action from U.S. Appl. No. 14/448,814 dated Feb. 16, 2016, 14 pages.
Final Office Action from U.S. Appl. No. 14/448,814 dated Jun. 14, 2016, 17 pages.
Final Office Action from U.S. Appl. No. 14/448,814 dated Oct. 6, 2017, 24 pages.
Final Office Action from U.S. Appl. No. 14/448,868 dated Aug. 19, 2016, 11 pages.
Final Office Action from U.S. Appl. No. 14/859,328, dated Mar. 6, 2017, 26 pages.
Final Office Action from U.S. Appl. No. 15/396,452, dated Feb. 27, 2018, 24 pages.
Final Office Action from U.S. Appl. No. 15/595,460, dated Jan. 11, 2018, 19 pages.
Final Office Action from U.S. Appl. No. 15/881,522, dated Feb. 6, 2019, 21 pages.
Final Office Action from U.S. Appl. No. 15/954,188, dated Feb. 25, 2019, 8 pages.
First Office Action and Search Report from foreign counterpart China Patent Application No. 201380068869.3, dated Sep. 19, 2017, 17 pages.
First Office Action and Search Report from foreign counterpart China Patent Application No. 201480025959.9, dated Jul. 7, 2017, 10 pages.
Fourth Office Action from foreign counterpart China Patent Application No. 201480025959.9, dated Apr. 12, 2019, 10 pages.
Grother, P.J., et al., NIST. Report on the Evaluation of 2D Still-Image Face Recognition Algorithms, NIST IR 7709. s.l, NIST, 2011, Jun. 22, 2010, pp. 1-58.
GSM Arena, "Ice Cream Sandwich's Face Unlock duped using a photograph," Nov. 13, 2011, downloaded from http://www.gsmarena.com/ice_cream_sandwichs_face_unlock_duped_using_a_photograph-news-3377.php on Aug. 18, 2015, 2 pages.
Heikkila M., et al., "A Texture-Based Method for Modeling the Background and Detecting Moving Objects", Oulu : IEEE , Jun. 22, 2005, Draft, Retrieved from the Internet: http://www.ee.oulu.fi/mvg/files/pdf/pdf_662.pdf, 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Preliminary Report On Patentability for Application No. PCT/US2013/077888, dated Jul. 9, 2015, 7 pages.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.

(56) References Cited

OTHER PUBLICATIONS

International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
Notification of Grant of Invention Patent, CN App. No. 201580022332.2, dated Sep. 4, 2020, 4 pages (2 pages of English Translation and 2 pages of Original Document).
Notification of Grant of Invention Patent, CN App. No. 201580041803.4, dated Oct. 9, 2020, 4 pages (2 pages of English Translation and 2 pages of Original Document).
Second Office Action, CN App. No. 201580040831.4, dated Sep. 2, 2020, 8 pages (5 pages of English Translation and 3 pages of Original Document).
Notice of Allowance from U.S. Appl. No. 14/448,697 dated Sep. 1, 2016, 3 pages.
Notice of Allowance from U.S. Appl. No. 14/448,697 dated Sep. 15, 2015, 14 pages.
Notice of Allowance from U.S. Appl. No. 14/448,747, dated Jun. 20, 2017, 14 pages.
Notice of Allowance from U.S. Appl. No. 14/448,868, dated Apr. 27, 2017, 62 pages.
Notice of Allowance from U.S. Appl. No. 14/448,868, dated Jun. 26, 2017, 14 pages.
Notice of Allowance from U.S. Appl. No. 14/448,868, dated Mar. 23, 2017, 57 pages.
Notice of Allowance from U.S. Appl. No. 14/448,868, dated Nov. 17, 2017, 15 pages.
Notice of Allowance from U.S. Appl. No. 14/487,992, dated Apr. 12, 2017, 14 pages.
Notice of Allowance from U.S. Appl. No. 14/487,992, dated Dec. 27, 2016, 28 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Notice of Allowance from U.S. Appl. No. 14/487,992 dated Sep. 6, 2016, 26 pages.
Notice of Allowance from U.S. Appl. No. 14/859,328, dated Feb. 1, 2018, 18 pages.
Notice of Allowance from U.S. Appl. No. 15/396,454, dated Sep. 18, 2018, 79 pages.
Notice of Allowance from U.S. Appl. No. 15/595,460, dated Mar. 14, 2019, 32 pages.
Notice of Allowance from U.S. Appl. No. 15/595,460, dated May 17, 2019, 10 pages.
Notice of Allowance from U.S. Appl. No. 15/595,460, dated Oct. 9, 2018, 8 pages.
Notice of Allowance from U.S. Appl. No. 15/900,620, dated Feb. 15, 2019, 20 pages.
Notice of Allowance from U.S. Appl. No. 15/954,188, dated Apr. 26, 2019, 5 pages.
Notice of Reasons for Rejection from foreign counterpart Japanese Patent Application No. 2017-505513, dated Oct. 22, 2018, 6 pages.
Notice of Reasons for Rejection from foreign counterpart Japanese Patent Application No. 2016-566924, dated Mar. 7, 2019, 23 pages.
Notification Concerning Transmittal of International Preliminary Report on Patentability for Application No. PCT/US14/39627, dated Dec. 10, 2015, 8 pages.
Notification for Granting Patent Right and Search Report from foreign counterpart Chinese Patent Application No. 201380068869.3, dated May 4, 2018, 10 pages.
Notification of Reason for Rejection from foreign counterpart Japanese Patent Application No. 2016-505506, dated Feb. 13, 2018, 6 pages.
Notification of Reasons for Refusal from foreign counterpart Japanese Patent Application No. 2017-505072, dated Apr. 15, 2019, 8 pages.
Notification of Reasons for Refusal from foreign counterpart Japanese Patent Application No. 2017-514840, dated Apr. 1, 2019, 10 pages.
Notification of Reasons for Rejection from foreign counterpart Japanese Patent Application No. 2016-0516743, dated Apr. 23, 2018, 12 pages.
Notification of Reasons for Rejection from foreign counterpart Japanese Patent Application No. 2016-566912, dated Jan. 31, 2019, 11 pages.
Notification of Transmittal of the International Search Report and the Written Opinion from counterpart Patent Cooperation Treaty Application No. PCT/US14/31344, dated Nov. 3, 2014, 16 pages.
Notification of Transmittal of the International Search Report and the Written Opinion from counterpart Patent Cooperation Treaty Application No. PCT/US14/39627, dated Oct. 16, 2014, 10 pages.
Notification of Transmittal or International Search Report and Written Opinion from PCT/US2015/028927, dated Jul. 30, 2015, 12 pages.
OASIS Standard, "Authentication Context for the OASIS Security Assertion Markup Language (SAML) V2.0," Mar. 15, 2005, 70 pages.
Office Action and Search Report from foreign counterpart Chinese Patent Application No. 201480031042.X, dated Dec. 4, 2017, 20 pages.
Office Action and Search Report from foreign counterpart Taiwan Patent Application No. 106125986, dated Mar. 19, 2018, 6 pages.
Office Action from foreign counterpart Japanese Patent Application No. 2015-550778, dated Feb. 7, 2018, 14 pages.
Office Action from foreign counterpart Japanese Patent Application No. 2017-505504, dated Apr. 15, 2019, 3 pages.
Office Action from foreign counterpart Taiwan Patent Application No. 102148853, dated Feb. 17, 2017, 9 pages.
"OpenID Connect Core 1.0—draft 17," Feb. 3, 2014, 70 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.I. : Springer Science+Business Media, LLC, Aug. 4, 2010. Retrieved from the Internet: URL: http://www.cs.zju.edu.cn/-gpan/publication/2011-TeleSysliveness.pdf.
Partial Supplementary European Search Report from European Patent Application No. 14770682.4, dated Oct. 14, 2016, 8 pages.
Peng Y., et al., "RASL: Robust Alignment by Sparse and Low-Rank Decomposition for Lineariy Correlated Images", IEEE Conference on Computer Vision and Pattern Recognition, 2010, pp. 763-770. Retrieved from the Internet: URL: http://yima.csl.illinois.edu/psfile/RASL_CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio-and Video-Based Biometric Person Authentication, Springer Beriin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.

(56) References Cited

OTHER PUBLICATIONS

Requirement for Restriction/Election from U.S. Appl. No. 14/218,504 dated Aug. 16, 2016, 11 pages.
Communication pursuant to Article 94(3) EPC, EP App. No. 15786487.7, dated Feb. 20, 2020, 6 pages.
Communication pursuant to Article 94(3) EPC, EP App. No. 15786487.7, dated Mar. 13, 2019, 5 pages.
Corrected Notice of Allowability, U.S. Appl. No. 14/218,646, dated May 26, 2020, 5 pages.
Crowley et al., "Online Identity and Consumer Trust: Assessing Online Risk", Available Online at <https://www.brookings.edu/wp-content/uploads/2016/06/0111_online_identity_trust.pdf>, Jan. 11, 2011, 15 pages.
Decision of Final Rejection, JP App. No 2016-566924, dated Feb. 27, 2020, 8 pages (5 pages of English Translation and 3 pages of Original Document).
Decision of Final Rejection, JP App. No. 2017-505072, dated Feb. 25, 2020, 9 pages (5 pages of English Translation and 4 pages Original Document).
Decision to Grant a Patent, EP App. No. 15827363.1, dated Aug. 8, 2019, 2 pages.
Decision to Grant a Patent, EP App. No. 15841530.7, dated Dec. 5, 2019, 2 pages.
Decision to Grant, JP App. No. 2016-566912, dated Dec. 26, 2019, 3 pages (2 pages of English Translation and 1 page of Original Document).
Final Office Action, U.S. Appl. No. 15/822,531, dated Apr. 7, 2020, 22 pages.
First Office Action CN App. No. 201580040831.4, dated Mar. 3, 2020, 31 pages (18 pages of English Translation and 13 pages of Office Action).
First Office Action, CN App. No. 201580022332.2, dated Aug. 5, 2019, 14 pages (7 pages of English Translation and 7 pages of Original Document).
First Office Action, CN App. No. 201580040836.7, dated Apr. 22, 2020, 11 pages (5 pages of English Translation and 6 pages of Original Document).
Intention to Grant under Rule 71(3) EPC, EP App. No. 15826364.0, dated Feb. 18, 2020, 6 pages.
Intention to Grant under Rule 71(3) EPC, EP App. No. 15826660.1, dated Apr. 28, 2020, 6 pages.
Intention to Grant under Rule 71(3) EPC, EP App. No. 15828152.7, dated Apr. 1, 2020, 6 pages.
International Preliminary Report on Patentability, PCT App. No. PCT/US2018/062608, dated Jun. 11, 2020, 9 pages.
International Search Report and Written Opinion, PCT App. No. PCT/US2020/020439, dated May 27, 2020, 9 pages.
Manabe et al., "Person Verification using Handwriting Gesture", Proceedings of the 26th Annual Conference of Japanese Society for Arlincal Intelligence, 2012, 9 pages (English Abstract Submitted).
Non-Final Office Action, U.S. Appl. No. 15/229,233, dated Jan. 31, 2020, 18 pages.
Non-Final Office Action, U.S. Appl. No. 15/822,531, dated Dec. 11, 2019, 19 pages.
Notice of Allowance, U.S. Appl. No. 14/145,466, dated Feb. 12, 2020, 12 pages.
Notice of Allowance, U.S. Appl. No. 14/218,646, dated Dec. 17, 2019, 6 pages.
Notice of Allowance, U.S. Appl. No. 14/218,646, dated Mar. 25, 2020, 8 pages.
Notice of Allowance, U.S. Appl. No. 14/218,677, dated May 8, 2020, 10 pages.
Notice of Allowance, U.S. Appl. No. 15/229,233, dated May 19, 2020, 10 pages.
Notice of Allowance, U.S. Appl. No. 15/229,254, dated Jan. 15, 2020, 9 pages.
Notice of Allowance, U.S. Appl. No. 15/229,254, dated Mar. 17, 2020, 3 pages.
Notice of Allowance, U.S. Appl. No. 15/881,522, dated Apr. 20, 2020, 10 pages.
Notice of Allowance, U.S. Appl. No. 15/881,522, dated Dec. 31, 2019, 10 pages.
Notice of Reasons for Refusal, JP App. No. 2018-209608, dated Oct. 7, 2019, 11 pages (7 pages of English Translation and 4 pages of Original Document).
Office Action, CN App No. 201580049696.X, dated Feb. 6, 2020, 11 pages (5 pages of English Translation and 6 pages of Original Document).
Second Office Action, CN App. No. 201580022332.2, dated May 7, 2020, 7 pages (4 pages of English Translation and 3 pages of Original Document).
Second Office Action, CN App. No. 201580040813.6, dated Mar. 24, 2020, 19 pages (11 pages of English Translation and 8 pages of Original Document).
Summon to Attend Oral Proceedings pursuant to Rule 115(1) EPC, EP App. No. 15827334.2, Dec. 17, 2019, 11 pages.
Office Action, EP App. No. 14803988.6, dated Mar. 9, 2021, 11 pages.
Final Office Action, U.S. Appl. No. 15/822,531, dated Jun. 3, 2021, 19 pages.
Non-Final Office Action, U.S. Appl. No. 16/244,705, dated Jun. 17, 2021, 33 pages.
Supplementary Partial European Search Report and Search Opinion, EP App. No. 18882247.2, dated May 28, 2021, 14 pages.
Notice of Reasons for Refusal, JP App. No. 2018-209608, dated Jul. 12, 2021, 07 pages (4 pages of English Translation and 3 pages of Original Document).
Notification of Reason for Refusal, KR App. No. 10-2017-7003449, dated Jul. 7, 2021, 14 pages (7 pages of English Translation and 7 pages of Office Action).
Non-Final Office Action, U.S. Appl. No. 16/392,301, dated Mar. 22, 2021, 17 pages.
Final Office Action, U.S. Appl. No. 16/392,301, dated Jun. 30, 2021, 20 pages.
Brown et al., "U-Prove CTP R2 Whitepaper", Revision 17, Microsoft Corporation, Feb. 2011, pp. 1-22.
European Search Report and Search Opinion, EP App. No. 19738099.1, dated Jul. 26, 2021, 13 pages.
Intention to Grant, EP App. No. 14770682.4, dated Jul. 13, 2021, 6 pages.
Notice to File a Response, KR App. No. 10-2016-7033634, dated Jul. 7, 2021, 22 pages (13 pages of English Translation and 9 pages of Original Document).
Notice to File a Response, KR App. No. 10-2017-7003444, dated Jul. 7, 2021, 26 pages (12 pages of English Translation and 14 pages of English Translation).
Othman et al., "The Horcrux Protocol: A Method for Decentralized Biometric-based Self-sovereign Identity", 2018 International Joint Conference on Neural Networks (IJCNN), Nov. 20, 2017, 7 pages.
Decision of Appeal, JP App. No 2017-505513, Mar. 4, 2021, 4 pages (2 pages of English Translation and 2 pages of Original Document).
Non-Final Office Action, U.S. Appl. No. 16/289,145, dated Feb. 9, 2021, 22 pages.
Notice of Allowance, CN App. No. 201580040813.6, dated Dec. 2, 2020, 2 pages of Original Document Only.
Notification to Grant Patent Right for Invention, CN App. No. 201580040831.4, dated Dec. 29, 2020, 4 pages (2 pages of English Translation and 2 pages of Original Document).
Final Office Action, U.S. Appl. No. 16/289,145, dated Jul. 28, 2021, 24 pages.
Notice Of Allowance, KR App. No 10-2016-7033631, dated Jan. 13, 2022, 3 pages (1 page of English Translation and 2 pages of Original Document).
Notice Of Allowance, KR App. No 10-2017-7003447, dated Jan. 12, 2022, 3 pages (1 page of English Translation and 2 pages of Original Document).
Notice of Reasons for Refusal, JP App. No. 2020-180503, dated Jan. 26, 2022, 10 pages (6 pages of English Translation and 4 pages of Original Document).
Notification of Reason for Refusal, KR App. No 10-2016-7033634, dated Jan. 26, 2022, 6 pages (3 pages of English Translation and 3 pages of Original Document).

(56) References Cited

OTHER PUBLICATIONS

Notification of Reason for Refusal, KR App. No 10-2017-7003450, dated Jan. 27, 2022, 12 pages (6 pages of English Translation and 6 pages of Original Document).
Decision to grant a European patent, EP App. No. 14770682.4, dated Nov. 25, 2021, 3 pages.
Decision to grant a European patent, EP App. No. 14803988.6, dated Jan. 20, 2022, 2 pages.
Grant of Patent, KR App. No. 10-2017-7003444, dated Jan. 6, 2022, 4 pages (2 pages of English Translation and 2 pages of Original Document).
Final Office Action, U.S. Appl. No. 16/244,705, dated Jan. 27, 2022, 36 pages.
Non-Final Office Action, U.S. Appl. No. 16/392,301, dated Feb. 24, 2022, 14 pages.
Advisory Action, U.S. Appl. No. 15/822,531, dated Dec. 10, 2021, 4 pages.
Non-Final Office Action, U.S. Appl. No. 16/289,145, dated Dec. 14, 2021, 23 pages.
International Preliminary Report on Patentability, PCT App. No. PCT/US2020/020439, dated Sep. 10, 2021, 8 pages.
Notification of Reason for Refusal, KR App. No 10-2016-7033631, dated Oct. 5, 2021, 20 pages (11 pages of English Translation and 9 pages of Original Document).
Notification of Reason for Refusal, KR App. No 10-2017-7007634, dated Sep. 10, 2021, 13 pages (7 pages of English Translation and 6 pages of Original Document).
Office Action, Korean App. No. 10-2017-7003447, dated Nov. 2, 2021, 6 pages (3 pages of English Translation and 3 pages of Original Document).
Supplementary European Search Report and Search Opinion, EP App. No 18882247.2, dated Aug. 30, 2021, 13 pages.
Intention to Grant, EP App. No. 14803988.6, dated Nov. 8, 2021, 7 pages.
Office Action, KR App. No. 10-2017-7003592, dated Nov. 16, 2021, 5 pages of Original Document Only.
European Search Report and Search Opinion, EP App. No. 21214856.3, dated Mar. 23, 2022, 9 pages.
Final Office Action, U.S. Appl. No. 16/289,145, dated Mar. 25, 2022, 23 pages.
Non-Final Office Action, U.S. Appl. No. 15/822,531, dated Mar. 29, 2022, 16 pages.
Final Office Action, U.S. Appl. No. 16/392,301, dated Jun. 2, 2022, 18 pages.
Final Office Action, U.S. Appl. No. 15/822,531, dated Sep. 28, 2022, 16 pages.
Non-Final Office Action, U.S. App. No. 16/289,145, dated Sep. 15, 2022, 9 pages.
Notice of Allowance, KR App. No. 10-2016-7033634, dated Jul. 20, 2022, 3 pages (1 page of English Translation and 2 pages of Original Document).
Notice of Allowance, KR App. No. 10-2017-7003449, dated Mar. 20, 2022, 3 pages (1 page of English Translation and 2 pages of Original Document).
Notice of Allowance, KR App. No. 10-2017-7003450, dated Jul. 27, 2022, 3 pages (1 page of English Translation and 2 pages of Original Document).
Notice of Allowance, KR App. No. 10-2017-7003592, dated Jun. 9, 2022, 3 pages (1 page of English Translation and 2 pages of Original Document).
Notice of Allowance, KR App. No. 10-2017-7007634, dated Apr. 22, 2022, 3 pages (1 page of English Translation and 2 pages of Original Document).
Notice of Allowance, U.S. Appl. No. 16/244,705, dated Aug. 25, 2022, 20 pages.
Trial and Appeal Decision, JP App. No. 2018-209608, dated Apr. 11, 2022, 15 pages (8 pages of English Translation and 7 pages of Original Document).
Final Office Action, U.S. Appl. No. 16/289,145, dated Jan. 31, 2023, 12 pages.
Richards, G., "One-Time Password (OTP) Pre-Authentication," Internet Engineering Task Force (IETF), RFC 6560, Apr. 2012, 43 pages, XP015081490.
Supplementary European Search Report and Search Opinion, EP App. No. 20782486.3, dated Nov. 28, 2022, 10 pages.
Notice of Allowance, U.S. Appl. No. 16/244,705, dated Mar. 1, 2023, 16 pages.
Notice of Reasons for Refusal, JP App. No. 2020-538981, dated Feb. 27, 2023, 7 pages (4 pages of English Translation and 3 pages of Original Document).
Request for the Submission of an Opinion, KR App. No. 10-2016-0164456, dated Feb. 24, 2023, 5 pages (2 pages of English Translation and 3 pages of Original Document).
Notice of Allowance, U.S. Appl. No. 16/244,705, dated Nov. 30, 2022, 16 pages.
Notice of Allowance, U.S. Appl. No. 16/392,301, dated Dec. 9, 2022, 10 pages.
Notice of Reasons for Refusal, JP App. No. 2020-180503, dated Nov. 21, 2022, 5 pages (3 pages of English Translation and 2 pages of Original Document).
Notice of Reasons for Refusal, JP App. No. 2020-546306, dated Nov. 16, 2022, 17 pages (10 pages of English Translation and 7 pages of Original Document).
Decision of Refusal, JP App. No. 2020-546306, dated May 29, 2023, 7 pages (4 pages of English Translation and 3 pages of Original Document).
Decision to Grant a Patent, JP App. No. 2020-180503, dated Jun. 1, 2023, 4 pages (2 pages of English Translation and 2 pages of Original Document).
Office Action, EP App. No. 18882247.2, dated Mar. 27, 2023, 5 pages.

* cited by examiner

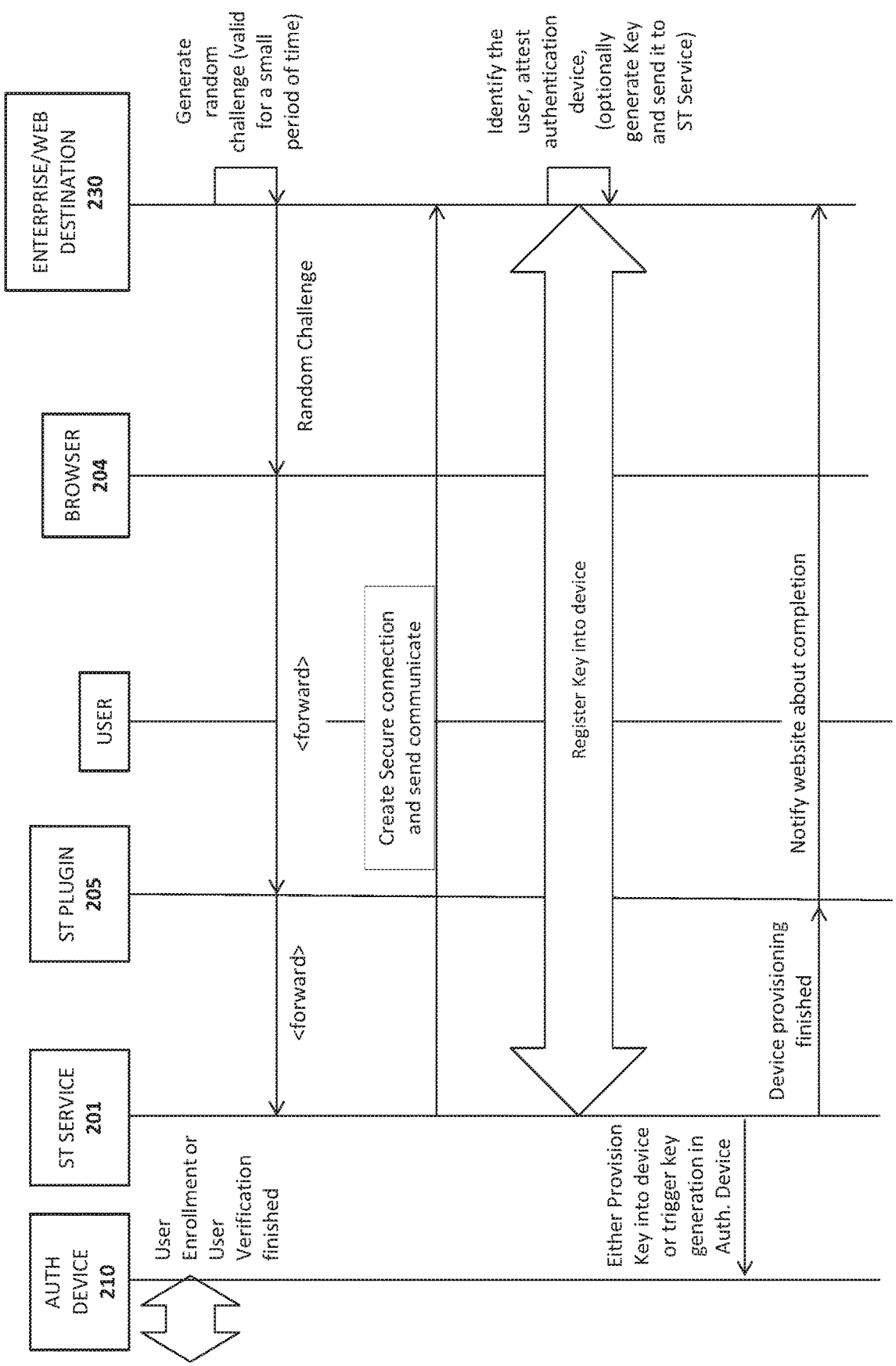

SYSTEM AND METHOD FOR EFFICIENT CHALLENGE-RESPONSE AUTHENTICATION

BACKGROUND

Field of the Invention

This invention relates generally to the field of data processing systems. More particularly, the invention relates to a system and method for efficient challenge-response authentication.

Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score based on the similarity between the extracted features and the biometric reference data 110. The biometric reference data 110 is typically the result of an enrollment process in which the user enrolls a fingerprint, voice sample, image or other biometric data with the device 100. An application 105 may then use the score to determine whether the authentication was successful (e.g., if the score is above a certain specified threshold).

While the system shown in FIG. 1 is oriented towards biometric authentication, various other or additional authentication techniques may be employed on the exemplary client 120. For example, the client-side authenticators may be based on a PIN or other secret code (e.g., a password) entered by the user and/or may be triggered based on user presence (e.g., a button that user pushes to verify presence).

Systems have been designed for providing secure user authentication over a network using biometric sensors. In such systems, the score generated by the application, and/or other authentication data, may be sent over a network to authenticate the user with a remote server. For example, Patent Application No. 2011/0082801 ("'801 application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of U.S. Patent Applications ("Co-pending Applications"), all filed Dec. 29, 1012, which are assigned to the present assignee and incorporated herein by reference: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework.

Briefly, the Co-Pending Applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc). The user may subsequently register the authentication devices with one or more servers over a network (e.g., Websites or other relying parties equipped with secure transaction services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy.

BRIEF DESCRIPTION OF THE DRAWINGS

A better understanding of the present invention can be obtained from the following detailed description in conjunction with the following drawings, in which:

FIG. 2C illustrates a transaction diagram showing how keys may be registered into authentication devices;

DETAILED DESCRIPTION OF PREFERRED EMBODIMENTS

Figure 1:
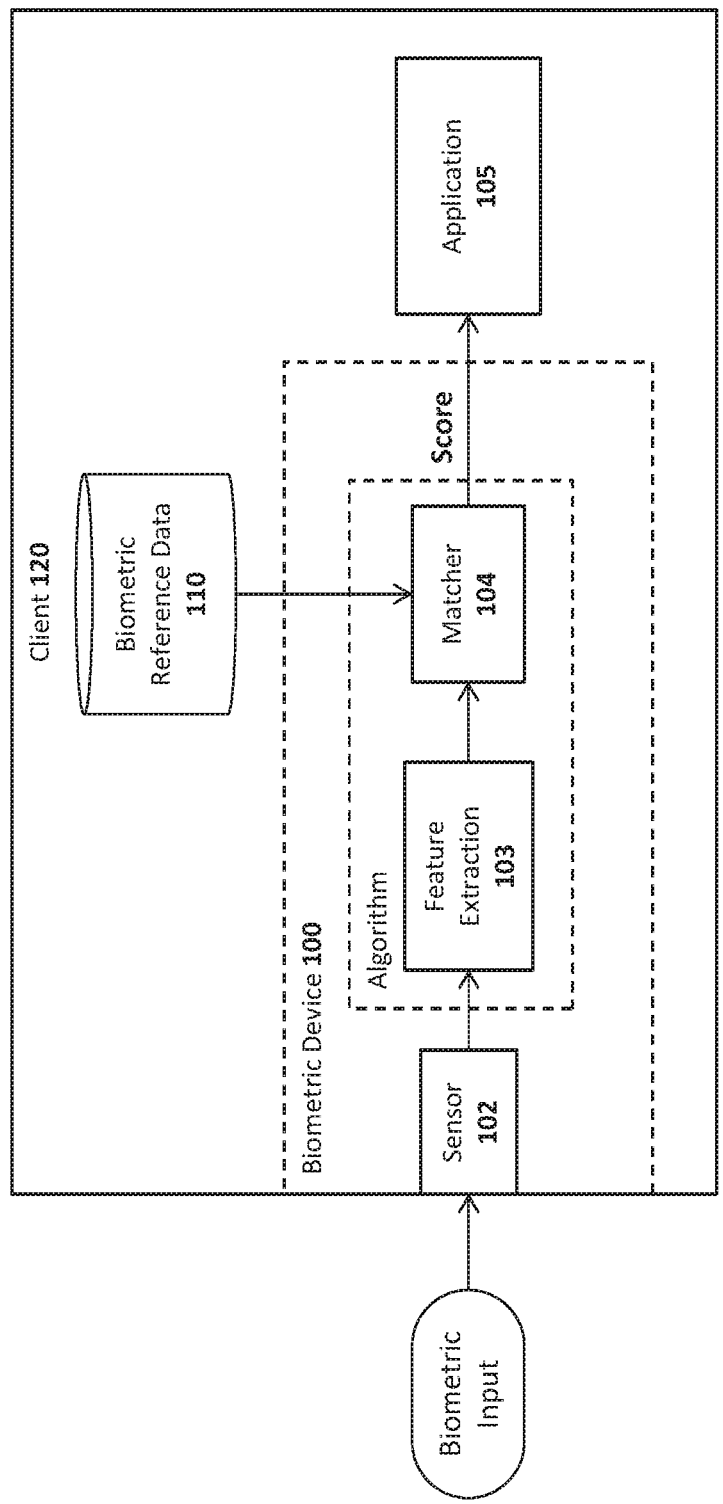
FIG. 1 illustrates an exemplary client device having biometric authentication capabilities.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The authentication capabilities may also include non-biometric devices such as trusted platform modules (TPMs) and smartcards.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally or remotely by an end user.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers which provided remote authentication capabilities may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

The embodiments of the invention described herein include techniques for authenticating a user for a transaction initiated through a secure transaction device. By way of example, the transaction may be a withdrawal, transfer, or other user-initiated operation and the transaction device may be an automatic teller machine (ATM), point-of-sale (PoS) transaction device or other device capable of executing transactions on behalf of the user. The transaction may involve, for example, completing a payment to purchase goods or services at a retail store or other retail location equipped with the device, withdrawing funds via the device, performing maintenance on the device, or any other transaction for which user authentication is required.

One embodiment of the invention provides techniques for authenticating the user locally (i.e. verifying the user), even in circumstances where the device is offline (i.e., not connected to a back-end authentication server) or semi-offline (i.e., only periodically connected to a back-end authentication server). In one embodiment, the user's client device is provided with the ability to cache authentication requests generated by a back-end authentication server (e.g., operated on behalf of the relying party) and the device is provided with data needed to verify the authentication response transmitted from the user's client device to the device.

Prior to discussing the details of these embodiments of the invention, an overview of remote user authentication techniques will be provided. These and other remote user authentication techniques are described in the co-pending applications, which are assigned to the assignee of the present application and incorporated herein by reference.

Remote User Authentication Techniques

Figure 2A:
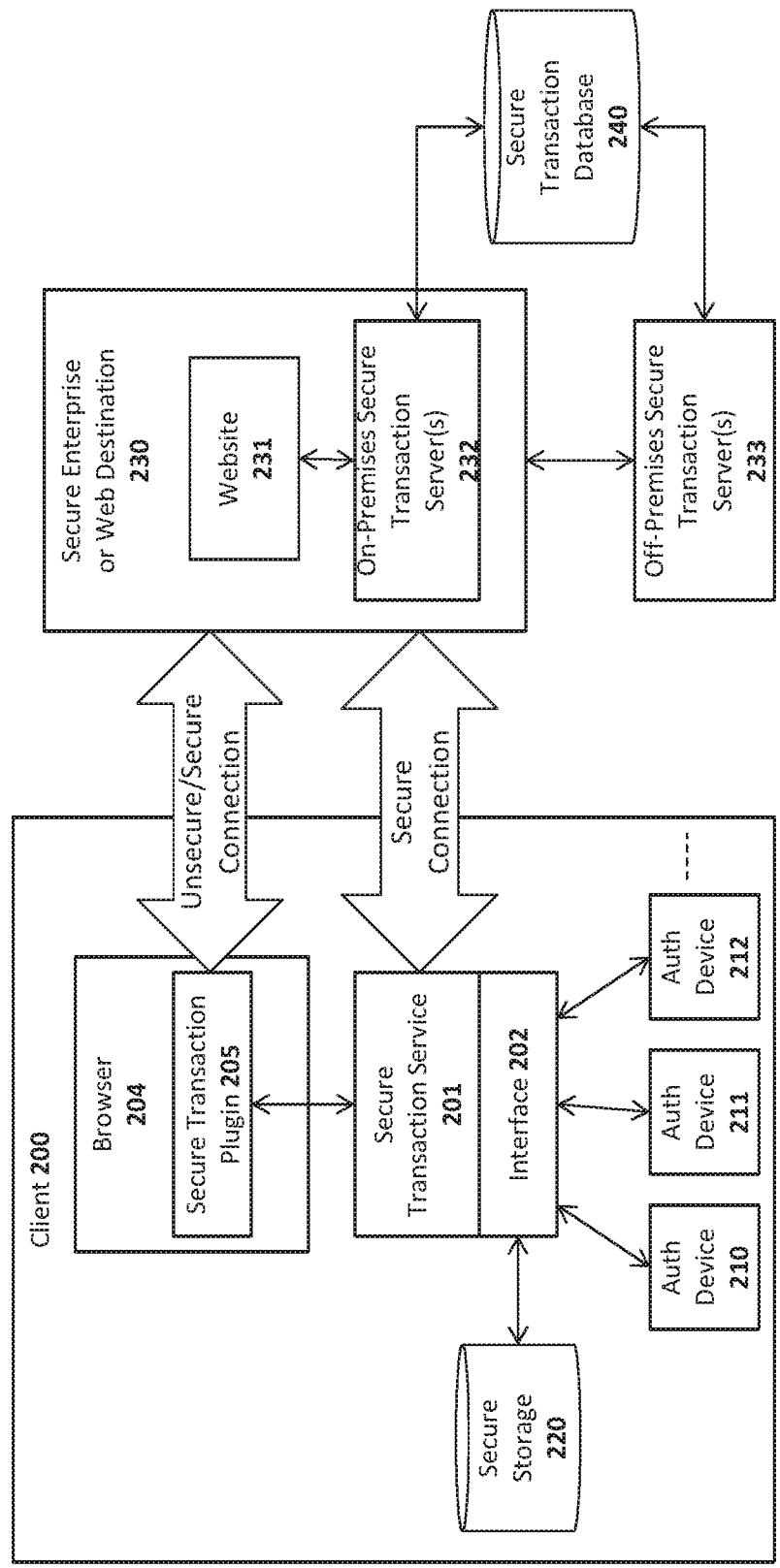
FIGS. 2A-B illustrate two different embodiments of a secure authentication system architecture.
Figure 2B:
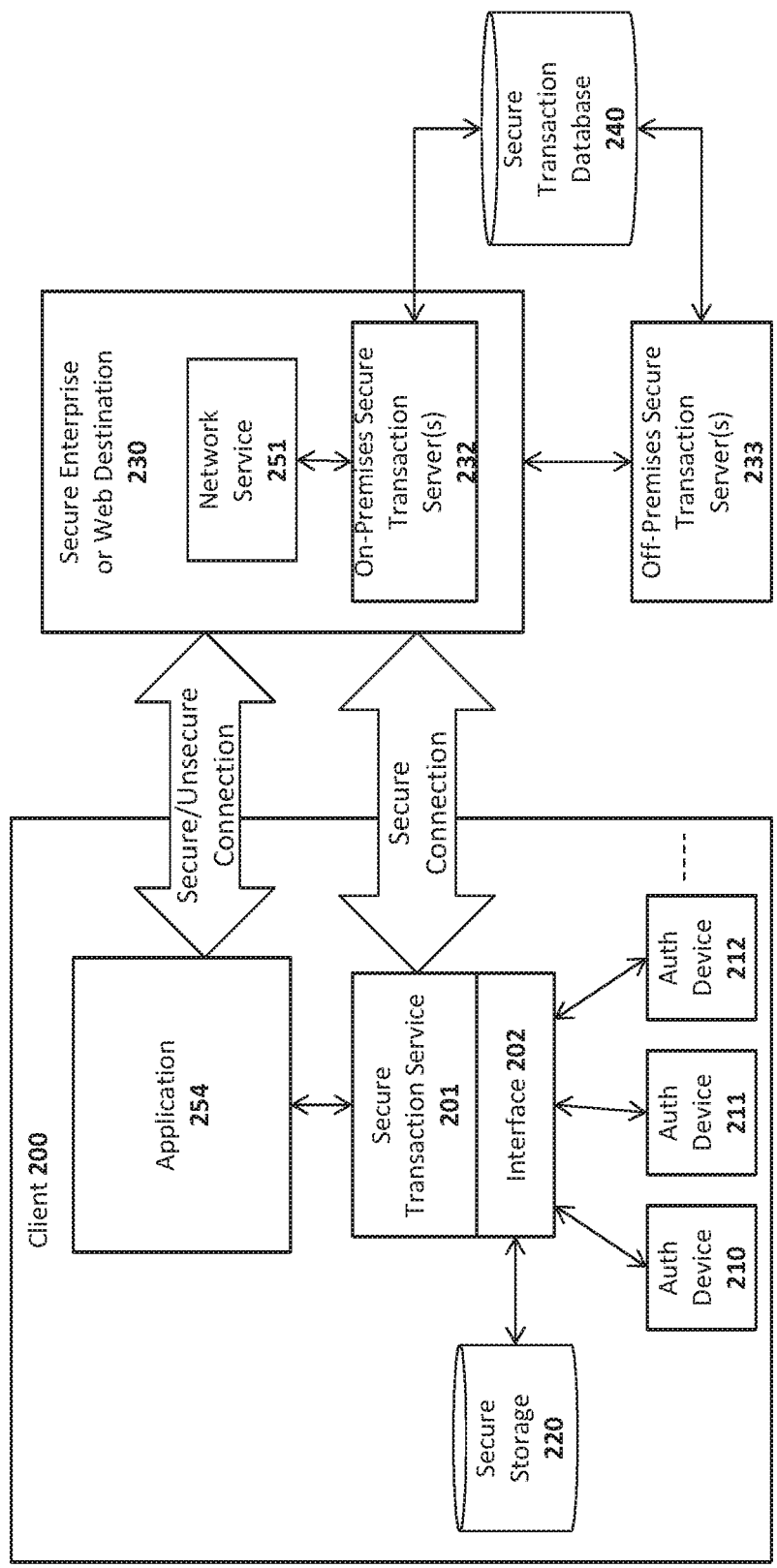

FIGS. 2A-B illustrate two embodiments of a system architecture comprising client-side and server-side components for remotely authenticating a user. The embodiment shown in FIG. 2A uses a browser plugin-based architecture for communicating with a website while the embodiment shown in FIG. 2B does not require a browser. The various authentication techniques and associated applications described herein may be implemented on either of these system architectures. For example, the authentication engines within client devices described herein may be implemented as part of the secure transaction service 201 including interface 202. It should be noted, however, that the embodiments described above may be implemented using logical arrangements of hardware and software other than those shown in FIGS. 2A-B.

Turning to FIG. 2A, the illustrated embodiment includes a client 200 equipped with one or more authentication devices 210-212 for enrolling and authenticating an end user. As mentioned above, the authentication devices 210-212 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards. A user may enroll the biometric devices by providing biometric data (e.g., swiping a finger on the fingerprint device) which the secure transaction service 201 may store as biometric template data in secure storage 220 (via interface 202).

While the secure storage 220 is illustrated outside of the secure perimeter of the authentication device(s) 210-212, in one embodiment, each authentication device 210-212 may have its own integrated secure storage. Additionally, each authentication device 210-212 may cryptographically protect the biometric reference data records (e.g., wrapping them using a symmetric key to make the storage 220 secure).

The authentication devices 210-212 are communicatively coupled to the client through an interface 202 (e.g., an application programming interface or API) exposed by a secure transaction service 201. The secure transaction service 201 is a secure application for communicating with one or more secure transaction servers 232-233 over a network and for interfacing with a secure transaction plugin 205 executed within the context of a web browser 204. As illustrated, the Interface 202 may also provide secure access to a secure storage device 220 on the client 200 which stores information related to each of the authentication devices 210-212 such as a device identification code (such as an Authenticator Attestation ID (AAID)), user identification code, user enrollment data (e.g., scanned fingerprint or other biometric data), and keys used to perform the secure authentication techniques described herein. For example, as discussed in detail below, a unique key may be stored into each of the authentication devices and subsequently used when communicating to servers 230 over a network such as the Internet.

As discussed below, certain types of network transactions are supported by the secure transaction plugin 205 such as HTTP or HTTPS transactions with websites 231 or other servers. In one embodiment, the secure transaction plugin is initiated in response to specific HTML tags inserted into the HTML code of a web page by the web server 231 within the secure enterprise or Web destination 230 (sometimes simply referred to below as "server 230"). In response to detecting such a tag, the secure transaction plugin 205 may forward transactions to the secure transaction service 201 for processing. In addition, for certain types of transactions (e.g., such as secure key exchange) the secure transaction service 201 may open a direct communication channel with the on-premises transaction server 232 (i.e., co-located with the website) or with an off-premises transaction server 233.

The secure transaction servers 232-233 are coupled to a secure transaction database 240 for storing user data, authentication device data, keys and other secure information needed to support the secure authentication transactions described below. It should be noted, however, that the underlying principles of the invention do not require the separation of logical components within the secure enterprise or web destination 230 shown in FIG. 2A. For example, the website 231 and the secure transaction servers 232-233 may be implemented within a single physical server or separate physical servers. Moreover, the website 231 and transaction servers 232-233 may be implemented within an integrated software module executed on one or more servers for performing the functions described below.

As mentioned above, the underlying principles of the invention are not limited to a browser-based architecture shown in FIG. 2A. FIG. 2B illustrates an alternate implementation in which a stand-alone application 254 utilizes the functionality provided by the secure transaction service 201 to authenticate a user over a network. In one embodiment, the application 254 is designed to establish communication sessions with one or more network services 251 which rely on the secure transaction servers 232-233 for performing the user/client authentication techniques described in detail below.

In either of the embodiments shown in FIGS. 2A-B, the secure transaction servers 232-233 may generate the keys which are then securely transmitted to the secure transaction service 201 and stored into the authentication devices within the secure storage 220. Additionally, the secure transaction servers 232-233 manage the secure transaction database 240 on the server side.

FIG. 2C illustrates a series of transactions for registering authentication devices. As mentioned above, during registration, a key is shared between the authentication device and one of the secure transaction servers 232-233. The key is stored within the secure storage 220 of the client 200 and the secure transaction database 220 used by the secure transaction servers 232-233. In one embodiment, the key is a symmetric key generated by one of the secure transaction servers 232-233. However, in another embodiment discussed below, asymmetric keys may be used. In this embodiment, the public key may be stored by the secure transaction servers 232-233 and a second, related private key may be stored in the secure storage 220 on the client. Moreover, in another embodiment, the key(s) may be generated on the client 200 (e.g., by the authentication device or the authentication device interface rather than the secure transaction servers 232-233). The underlying principles of the invention are not limited to any particular types of keys or manner of generating the keys.

A secure key provisioning protocol such as the Dynamic Symmetric Key Provisioning Protocol (DSKPP) may be used to share the key with the client over a secure communication channel (see, e.g., Request for Comments (RFC) 6063). However, the underlying principles of the invention are not limited to any particular key provisioning protocol.

Turning to the specific details shown in FIG. 2C, once the user enrollment or user verification is complete, the server 230 generates a randomly generated challenge (e.g., a cryptographic nonce) that must be presented by the client during device registration. The random challenge may be valid for a limited period of time. The secure transaction plugin detects the random challenge and forwards it to the secure transaction service 201. In response, the secure transaction service initiates an out-of-band session with the server 230 (e.g., an out-of-band transaction) and communicates with the server 230 using the key provisioning protocol. The server 230 locates the user with the user name, validates the random challenge, validates the device's attestation code (e.g., AAID) if one was sent, and creates a new entry in the secure transaction database 220 for the user. It may also generate the key or public/private key pair, write the key(s) to the database 220 and send the key(s) back to the secure transaction service 201 using the key provisioning protocol. Once complete, the authentication device and the server 230 share the same key if a symmetric key was used or different keys if asymmetric keys were used.

Figure 3A:
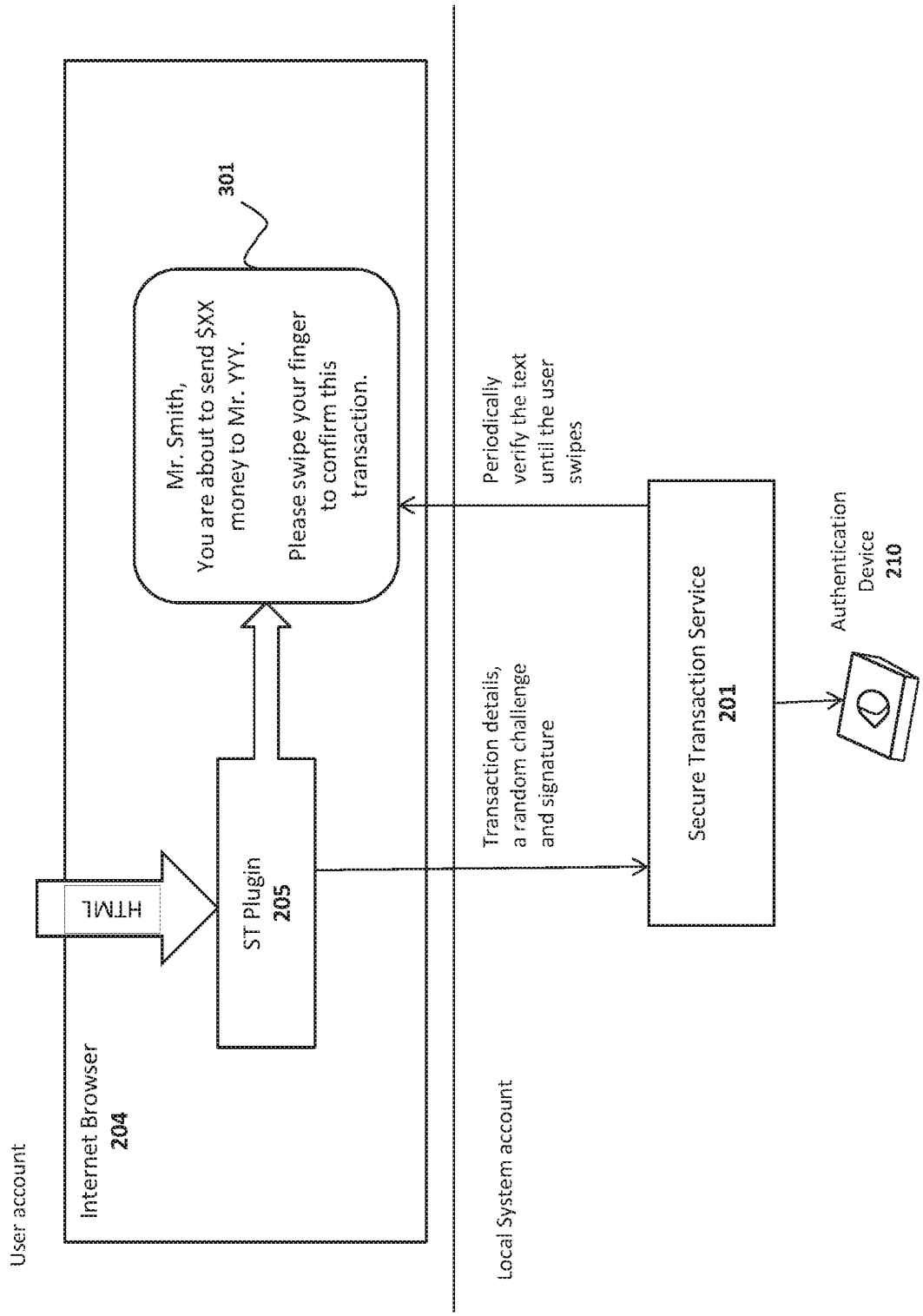
FIGS. 3A-B illustrates embodiments for secure transaction confirmation using a secure display.

FIG. 3A illustrates a secure transaction confirmation for a browser-based implementation. While a browser-based implementation is illustrated, the same basic principles may be implemented using a stand-alone application or mobile device app.

The secure transaction confirmation is designed to provide stronger security for certain types of transactions (e.g., financial transactions). In the illustrated embodiment, the user confirms each transaction prior to committing the transaction. Using the illustrated techniques, the user confirms exactly what he/she wants to commit and commits exactly what he/she sees displayed in a window 301 of the graphical user interface (GUI). In other words, this embodiment ensures that the transaction text cannot be modified by a "man in the middle" (MITM) or "man in the browser" (MITB) to commit a transaction which the user did not confirm.

In one embodiment, the secure transaction plugin 205 displays a window 301 in the browser context to show the transaction details. The secure transaction server 201 periodically (e.g., with a random interval) verifies that the text that is shown in the window is not being tampered by anyone (e.g., by generating a hash/signature over the displayed text). In a different embodiment, the authentication device has a trusted user interface (e.g. providing an API compliant to GlobalPlatform's TrustedUI).

The following example will help to highlight the operation of this embodiment. A user chooses items for purchase from a merchant site and selects "check out." The merchant site sends the transaction to a service provide which has a secure transaction server 232-233 implementing one or more of the embodiments of the invention described herein (e.g., PayPal). The merchant site authenticates the user and completes the transaction.

The secure transaction server 232-233 receives the transaction details (TD) and puts a "Secure Transaction" request in an HTML page and sends to client 200. The Secure Transaction request includes the transaction details and a random challenge. The secure transaction plugin 205 detects the request for transaction confirmation message and forwards all data to the secure transaction service 201. In an embodiment which does not use a browser or plugin, the information may be sent directly from the secure transaction servers to the secure transaction service on the client 200.

For a browser-based implementation, the secure transaction plugin 205 displays a window 301 with transaction details to the user (e.g. in a browser context) and asks the user to provide authentication to confirm the transaction. In an embodiment which does not use a browser or plugin, the secure transaction service 201, the application 254 (FIG. 2B), or the authentication device 210 may display the window 301. The secure transaction service 201 starts a timer and verifies the content of the window 301 being displayed to the user. The period of verification may be randomly chosen. The secure transaction service 201 ensures that user sees the valid transaction details in the window 301 (e.g., generating a hash on the details and verifying that the contents are accurate by comparing against a hash of the correct contents). If it detects that the content has been tampered with it prevents the confirmation token/signature from being generated.

After the user provides valid verification data (e.g. by, swiping a finger on the fingerprint sensor), the authentication device verifies the user and generates a cryptographic signature (sometimes referred to as a "token") with the transaction details and the random challenge (i.e., the signature is calculated over the transaction details and the nonce). This allows the secure transaction server 232-233 to ensure that the transaction details have not been modified between the server and the client. The secure transaction service 201 sends the generated signature and username to the secure transaction plugin 205 which forwards the signature to the secure transaction server 232-233. The secure transaction server 232-233 identifies the user with the username and verifies the signature. If verification succeeds, a confirmation message is sent to the client and the transaction is processed.

One embodiment of the invention implements a query policy in which a secure transaction server transmits a server policy to the client indicating the authentication capabilities accepted by the server. The client then analyzes the server policy to identify a subset of authentication capabilities which it supports and/or which the user has indicated a desire to use. The client then registers and/or authenticates the user using the subset of authentication tokens matching the provided policy. Consequently, there is a lower impact to the client's privacy because the client is not required to transmit exhaustive information about its authentication capabilities (e.g., all of its authentication devices) or other information which might be used to uniquely identify the client.

By way of example, and not limitation, the client may include numerous user verification capabilities such as a fingerprint sensor, voice recognition capabilities, facial recognition capabilities, eye/optical recognition capabilities, PIN verification, to name a few. However, for privacy reasons, the user may not wish to divulge the details for all of its capabilities to a requesting server. Thus, using the techniques described herein, the secure transaction server may transmit a server policy to the client indicating that it supports, for example, fingerprint, optical, or smartcard authentication. The client may then compare the server policy against its own authentication capabilities and choose one or more of the available authentication options.

One embodiment of the invention employs transaction signing on the secure transaction server so that no transaction state needs to be maintained on the server to maintain sessions with clients. In particular, transaction details such as transaction text displayed within the window 301 may be sent to the client signed by the server. The server may then verify that the signed transaction responses received by the client are valid by verifying the signature. The server does not need to persistently store the transaction content, which would consume a significant amount of storage space for a large number of clients and would open possibility for denial of service type attacks on server.

Figure 3B:
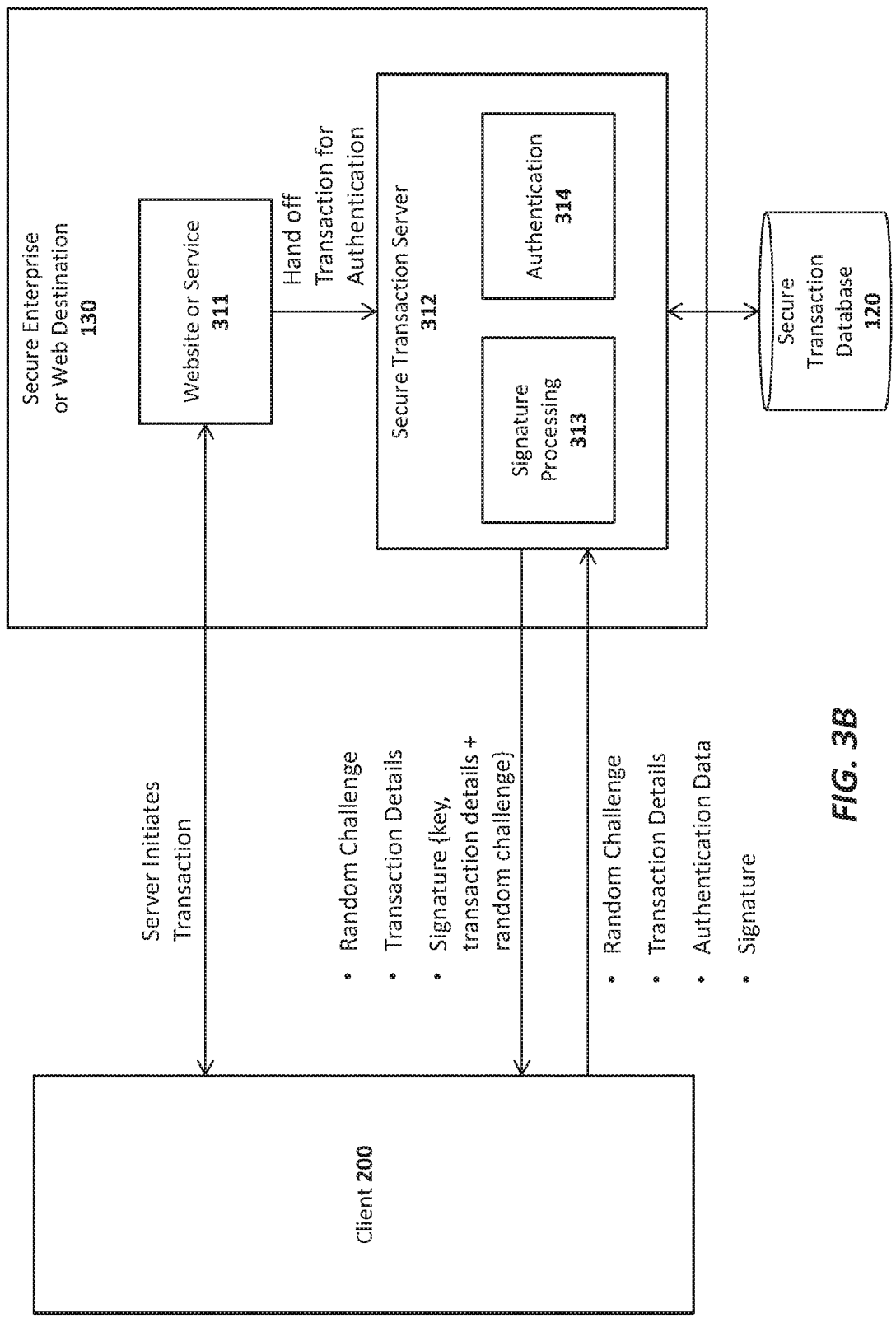

One embodiment of the invention is illustrated in FIG. 3B which shows a website or other network service 311 initiating a transaction with a client 200. For example, the user may have selected items for purchase on the website and may be ready to check out and pay. In the illustrated example, the website or service 311 hands off the transaction to a secure transaction server 312 which includes signature processing logic 313 for generating and verifying signatures (as described herein) and authentication logic for performing client authentication 314 (e.g., using the authentication techniques previously described).

In one embodiment, the authentication request sent from the secure transaction server 312 to the client 200 includes the random challenge such as a cryptographic nonce (as described above), the transaction details (e.g., the specific text presented to complete the transaction), and a signature generated by the signature processing logic 313 over the random challenge and the transaction details using a private key (known only by the secure transaction server).

Once the above information is received by the client, the user may receive an indication that user verification is required to complete the transaction. In response, the user may, for example, swipe a finger across a fingerprint scanner, snap a picture, speak into a microphone, or perform any other type of authentication permitted for the given transaction. In one embodiment, once the user has been successfully verified by the authentication device 210, the client transmits the following back to the server: (1) the random challenge and transaction text (both previously provided to the client by the server), (2) authentication data proving that the user successfully completed authentication, and (3) the signature.

The authentication module 314 on the secure transaction server 312 may then confirm that the user has correctly authenticated and the signature processing logic 313 regenerates the signature over the random challenge and the transaction text using the private key. If the signature matches the one sent by the client, then the server can verify that the transaction text is the same as it was when initially received from the website or service 311. Storage and processing resources are conserved because the secure transaction server 312 is not required to persistently store the transaction text (or other transaction data) within the secure transaction database 120.

Figure 4:
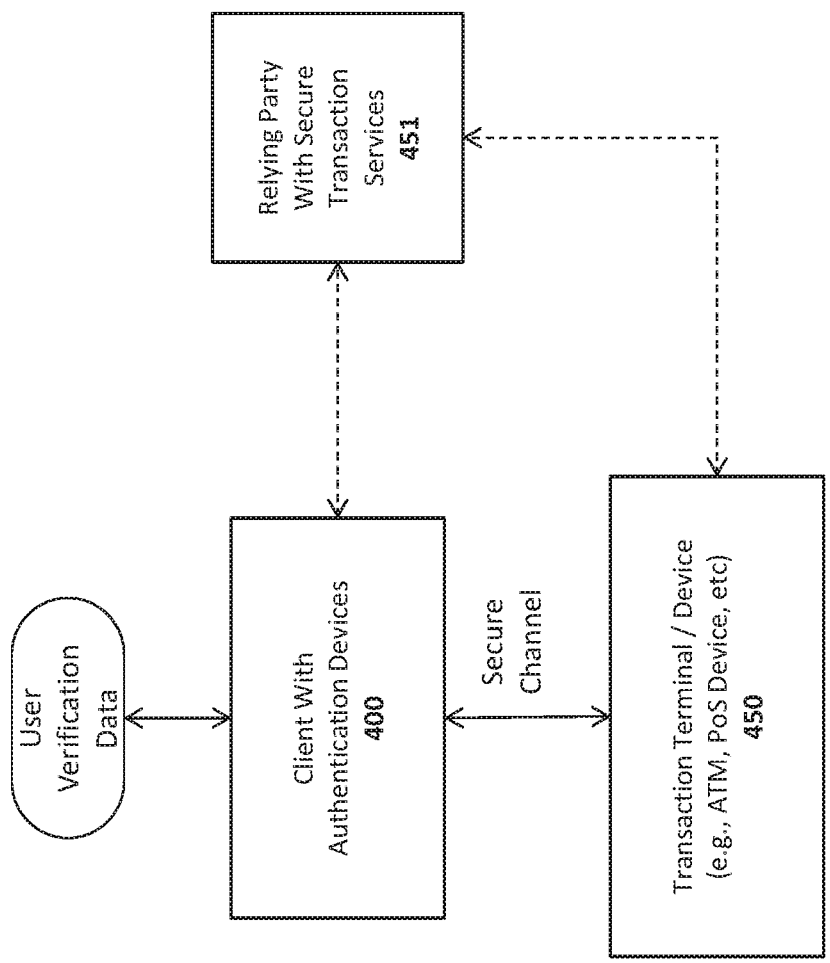
FIG. 4 illustrate one embodiment of the invention for performing authentication for a transaction with a device without established relation.

System and Method for Authenticating a Client to an Offline Device or a Device Having Limited Connectivity As mentioned, one embodiment of the invention includes techniques for authenticating the user locally (i.e. verifying the user), even in circumstances where the user device and device are offline (i.e., not connected to a back-end authentication server of a relying party) or semi-offline (i.e., where the user device is not connected to the relying party, but the device is). FIG. 4 illustrates one such arrangement in which a client 400 with authentication devices previously registered with a relying party 451 establishes a secure channel with a transaction device 450 to complete a transaction. By way of example, and not limitation, the transaction device may be an ATM, point-of-sale (PoS) transaction device at a retail location, Internet of Things (IoT) device, or any other device capable of establishing a channel with the client 400 and allowing the user to perform a transaction. The channel may be implemented using any wireless communication protocol including, by way of example and not limitation, near field communications (NFC) and Bluetooth (e.g., Bluetooth Low Energy (BTLE) as set forth in the Bluetooth Core Specification Version 4.0). Of course, the underlying principles of the invention are not limited to any particular communication standard.

As indicated by the dotted arrows, the connection between the client 400 and the relying party 451 and/or the connection between the transaction device 450 and the relying party 451 may be sporadic or non-existent. Real world applications in the area of payments often rely on such "off-line" use-cases. For example, a user with a client 400 (e.g., a Smartphone) may not have connectivity to the relying party 451 at the time of the transaction but may want to authorize a transaction (e.g. a payment) by authenticating to the transaction device 450. However, in some embodiments of the invention, the client 400 and/or transaction device 450 do exchange some information with the relying party 451 (although not necessarily during the authentication or transaction confirmation process described herein).

Traditionally, user verification has been implemented using a secret such as a personal identification number (PIN) to be captured by the device (e.g. the PoS transaction device or ATM). The device would then create an online connection to the relying party in order to verify the secret or would ask the user's authenticator (e.g., EMV banking card) for verifying the PIN. Such implementation has several disadvantages. It might require an online connection—which might be available sometimes, but not always. It also requires the user to enter a long-term valid secret into potentially untrusted devices, which are subject to shoulder-surfing and other attacks. Additionally it is inherently tied to the specific user verification method (e.g. PIN in this case). Finally, it requires the user to remember a secret such as a PIN, which may be inconvenient to the user.

The authentication techniques described herein provide significantly more flexibility in terms of user verification methods and security as they allow the user to rely on his/her own client's authentication capabilities. In particular, in one embodiment, a mobile application on the user's client caches authentication requests provided by the relying party during a time when the client is connected to the relying party. The authentication requests may include the same (or similar) information as the authentication requests described above (e.g., a nonce and a public key associated with an authenticator) as well as additional information including a signature over (at least parts of) the authentication request generated by a relying party, the verification key and potentially timing data indicating the time period within which the authentication request will remain valid (or conversely, the time after which the authentication request will expire). In one embodiment, the mobile application may cache multiple such connection requests (e.g., one for each transaction device or transaction device type).

In one embodiment, the cached authentication requests may then be used for transactions with the transaction device, in circumstances where the client/mobile app is incapable of connecting with the relying party. In one embodiment, the mobile app triggers the creation of the authentication response based on the cached authentication request containing the serverData and additional data received from the transaction device. The authentication response is then transmitted to the transaction device which then verifies the authentication response using a verification key provided from the relying party (e.g., during a time when the transaction device is connected with the relying party). In particular, the transaction device may use the key provided by the relying party to verify the signature over the serverData included in the authentication response. In one embodiment, the signature is generated by the relying party using a private relying party verification key and the transaction device verifies the signature using a corresponding public relying party verification key (provided to the transaction device by the relying party).

Once the transaction device verifies the serverData extracted from the authentication response, it may then use the public key extracted from the authentication request (e.g., Uauth.pub) to verify the authentication response generated by the client/mobile app (e.g., in the same or a similar manner to the verifications by the relying party described above, when the client is authenticating directly to the relying party).

In an alternate embodiment described below, the relying party provides the authentication request directly to the transaction device (rather than through the mobile app on the client device). In this embodiment, the transaction device may ask for the authentication request from the relying party upon receiving a request to complete a transaction from the mobile app on the client. Once it has the authentication request, it may validate the request and the authentication response as described above (e.g., by generating a signature and comparing it to the existing signature).

Figure 5A:
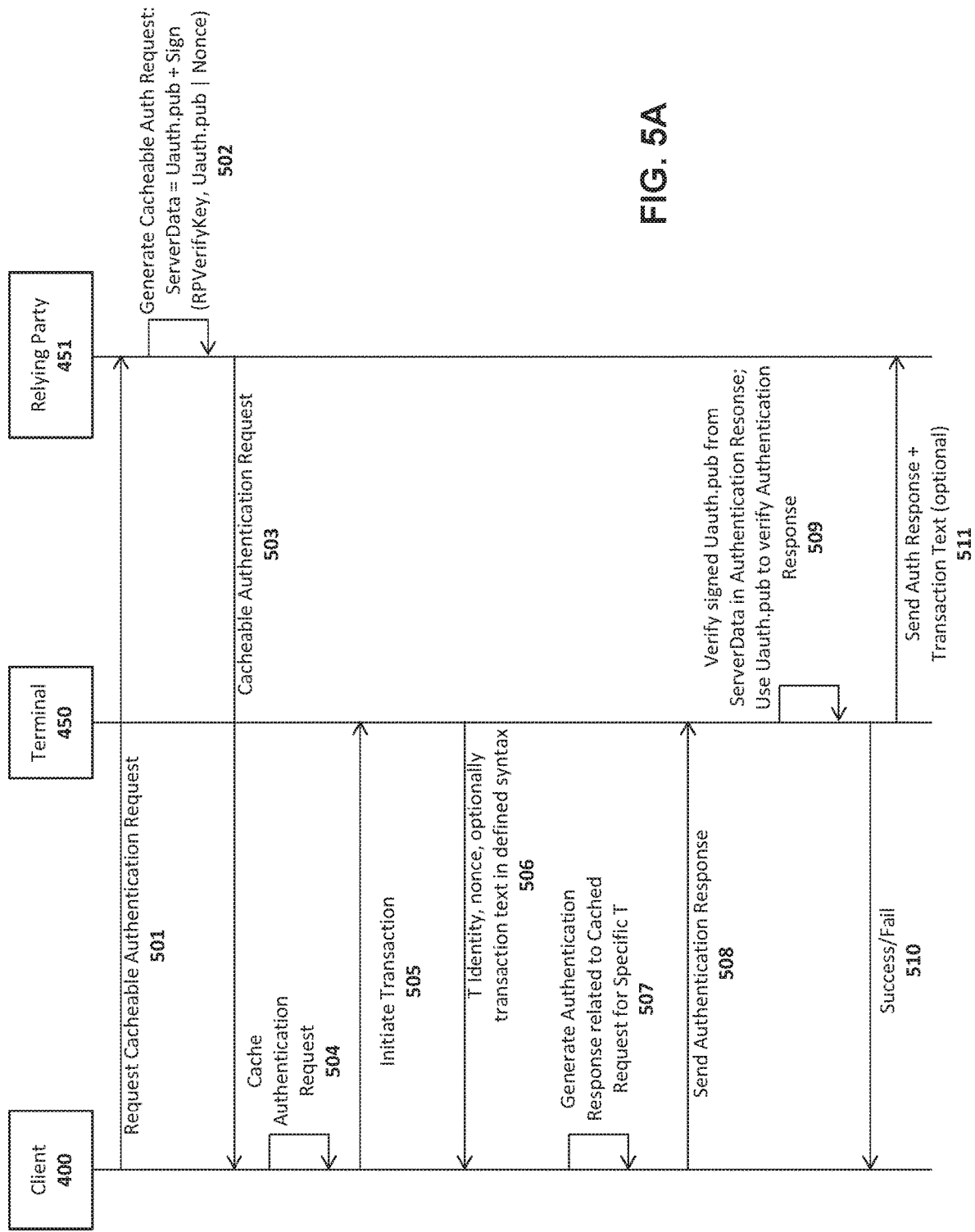
FIGS. 5A-B are transaction diagrams showing two different embodiments for performing authentication for a transaction.

FIG. 5A is a transaction diagram showing interactions between the client 400, transaction device 450 and relying party in an embodiment in which the client 400 caches the authentication request. This embodiment is sometimes referred to as the "full-offline" embodiment because it does not require the transaction device 450 to have an existing connection with the relying party.

At 501, the client requests a cacheable authentication request from the relying party. At 502, the relying party generates the cacheable authentication request, at 503 the authentication request is sent to the client, and at 504 the client caches the authentication request. In one embodiment, the authentication request includes the public key associated with the authenticator to be used for authentication (Uauth.pub) and a signature generated using the relying party verification key (RPVerifyKey) over the public key and a random nonce. If asymmetric keys are used, then RPVerifyKey used by the relying party to generate the signature is a private key having a corresponding public RPVerifyKey which the relying party has provided to the transaction device (potentially far in advance of processing the user authentication request).

In one embodiment, the authentication request also includes timing information indicating the length of time for which the authentication request will be valid (e.g., MaxCacheTime). In this embodiment, the signature for the cacheable authentication request may be generated over the combination of the public authentication key, the nonce, and the MaxCacheTime (e.g., ServerData=Uauth.pub|MaxCacheTime|serverNonce|Sign (RPVerifyKey, Uauth.pub-|MaxCacheTime|serverNonce)). In one embodiment, the authentication response includes more than one authentication key (e.g., one for each authenticator capable of authenticating the user) and the signature may be generated over all of these keys (e.g., along with the nonce and the MaxCacheTime).

As mentioned, the public RPVerifyKey needs to be known the transaction device 450, or any device intended to perform offline verification of the authentication requests/responses. This extension is required because the transaction device does not have any knowledge about the authentication keys registered at the relying party (i.e. no established relation exists between user device and the transaction device). Consequently, the relying party must communicate to the transaction device (or other device), in a secure manner, which key(s) are to be used for authentication response verification. The transaction device will verify the MaxCacheTime to determine whether the cached authentication request is still valid (to comply with the relying party's policy on how long the cached authentication request may be used).

At 505, the client establishes a secure connection to the transaction device and initiates a transaction. For example, if the transaction device is a PoS transaction device, the transaction may involve a debit or credit transaction. If the transaction device is an ATM, the transaction may involve a cash withdrawal or a maintenance task. The underlying principles of the invention are not limited to any particular type of transaction device or secure connection. In addition, at 505, the client may transmit the cached authentication request to the transaction device.

In response, at 506 the transaction device may transmit device identity information (e.g., a transaction device identification code), a random challenge (nonce) and optionally transaction text in a defined syntax to complete the transaction. The random challenge/nonce will then be cryptographically bound to the authentication response. This mechanism allows the device to verify that the user verification is fresh and hasn't been cached/reused.

In order to support transaction confirmations such as described above (see, e.g., FIGS. 3A-B and associated text), the transaction device may be required to create a standardized, and human readable representation of the transaction. "Standardized" as used herein means a format that can be parsed by the relying party (e.g. for final verification as indicated in operation 511 below) and/or the transaction device. It needs to be human readable because transaction confirmations require the authenticator to display it on the secure display of the client 400. An example of such an encoding could be XML where XSLT is used for visualization.

At 507, to generate the authentication response, an authentication user interface is displayed directing the user to perform authentication on the client using a particular authenticator (e.g., to swipe a finger on a fingerprint sensor, enter a PIN code, speak into a microphone, etc). Once the user provides authentication, the authentication engine on the client verifies the identity of the user (e.g., comparing the authentication data collected from the user with the user verification reference data stored in the secure storage of the authenticator) and uses the private key associated with the authentication device to encrypt and/or generate a signature over the random challenge (and also potentially the transaction device ID and/or the transaction text). The authentication response is then transmitted to the transaction device at 508.

At 509, the transaction device uses the public RPVerifyKey to verify the signature on the serverData (received at 505) if it has not done so already. Once the serverData is verified, it knows the public key associated with the authenticator used to perform the authentication (Uauth.pub). It uses this key to verify the authentication response. For example, it may use the public authentication key to decrypt or verify the signature generated over the nonce and any other related information (e.g., the transaction text, the transaction device ID, etc). If transaction confirmation is performed by the transaction device, then it may verify the transaction text displayed on the client by validating the signature generated over the transaction text and included in the authentication response at 508. Instead of having a cryptographically secured serverData structure, the transaction device could also verify unsigned serverData using an online connection to the relying party—if this is available (semi-offline case).

At 510, a success or failure indication is sent to the client depending on whether authentication was successful or unsuccessful, respectively. If successful, the transaction device will permit the transaction (e.g., debiting/crediting an account to complete a purchase, dispensing cash, performing administrative task, etc). If not, it will disallow the transaction and/or request additional authentication.

If a connection to the relying party is present, then at 511 the transaction device may transmit the authentication response to the relying party and/or the transaction text (assuming that the relying party is the entity responsible for verifying the transaction text). A record of the transaction may be recorded at the relying party and/or the relying party may verify the transaction text and confirm the transaction (not shown).

Figure 5B:
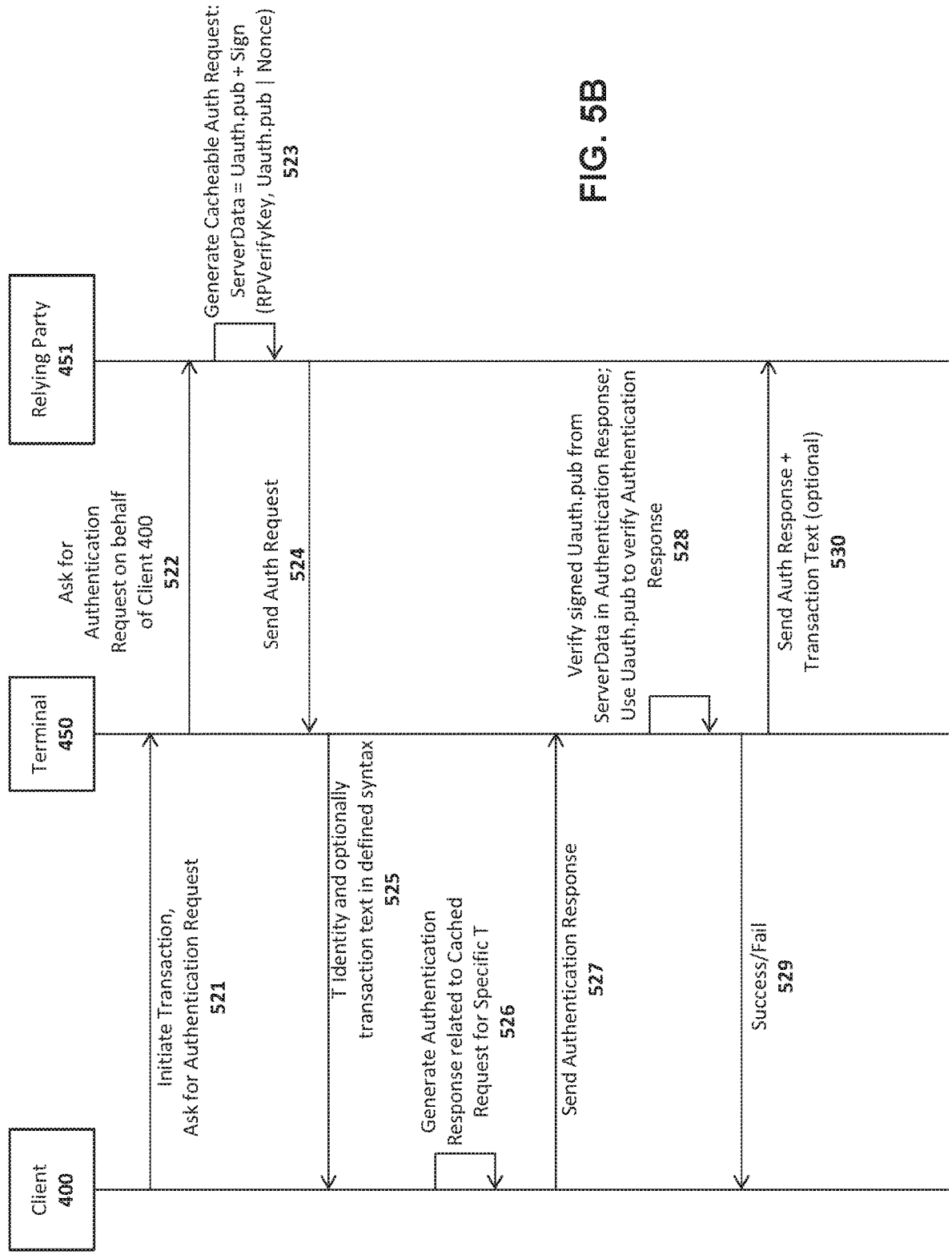

FIG. 5B is a transaction diagram showing interactions between the client 400, transaction device 450 and relying party in an embodiment in which the transaction device has a connection with and receives the authentication request from the relying party. This embodiment is sometimes referred to as the "semi-offline" embodiment because although the client does not have a connection to the relying party, the transaction device 450 does.

At 521, the client initiates a transaction, establishing a secure connection with the transaction device (e.g., NFC, Bluetooth, etc). At 522, the transaction device responsively asks for an authentication request from the relying party. At 523, the relying party generates the authentication request and at 524 the authentication request is sent to the transaction device. As in the embodiment shown in FIG. 5A, the authentication request may include the public key associated with the authenticator on the client to be used for authentication (Uauth.pub) and a signature generated using the relying party verification key (RPVerifyKey) over the public key and a random nonce. If asymmetric keys are used, then RPVerifyKey used by the relying party to generate the signature is a private key having a corresponding public RPVerifyKey which the relying party provides to the transaction device (potentially far in advance of processing the user authentication request). Instead of having a cryptographically secured serverData structure, the transaction device may also verify unsigned serverData using an online connection to the relying party—if this is available (semi-offline case).

In one embodiment, the serverData also includes timing information indicating the length of time for which the authentication request will be valid (e.g., MaxCacheTime). In this embodiment, the signature for the serverData may be generated over the combination of the public authentication key, the nonce, and the MaxCacheTime (e.g., ServerData=Uauth.pub|MaxCacheTime|serverNonce|Sign (RPVerifyKey, Uauth.pub|MaxCacheTime|serverNonce)). In one embodiment, the authentication response includes more than one authentication key (e.g., one for each authenticator) and the signature may be generated over all of these keys (e.g., along with the nonce and the MaxCacheTime).

In one embodiment, the remainder of the transaction diagram in FIG. 5B operates substantially as shown in FIG. 5A. At 525 the transaction device may transmit identity information (e.g., a transaction device identification code), a random challenge (nonce) and optionally transaction text in a defined syntax to complete the transaction. The random challenge/nonce will then be cryptographically bound to the authentication response. This mechanism allows the device to verify that the user verification is fresh and hasn't been cached.

In order to support transaction confirmations such as described above (see, e.g., FIGS. 3A-B and associated text), the transaction device may be required to create a standardized, and human readable representation of the transaction. "Standardized" as used herein means a format that can be parsed by the relying party (e.g. for final verification as indicated in operation 511 below) and/or the transaction device. It needs to be human readable because transaction confirmations require the authenticator to display it on the secure display of the client 400. An example of such an encoding could be XML where XSLT is used for visualization.

At 526, to generate the authentication response, an authentication user interface is displayed directing the user to perform authentication on the client using a particular authenticator (e.g., to swipe a finger on a fingerprint sensor, enter a PIN code, speak into a microphone, etc). Once the user provides authentication, the authentication engine on the client verifies the identity of the user (e.g., comparing the authentication data collected from the user with the user verification reference data stored in the secure storage of the authenticator) and uses the private key associated with the authentication device to encrypt and/or generate a signature over the random challenge (and also potentially the transaction device ID and/or the transaction text). The authentication response is then transmitted to the transaction device at 527.

At 528, the transaction device uses the public RPVerifyKey to verify the signature on the serverData (received at 524) if it has not done so already. Once the serverData is verified, it knows the public key associated with the authenticator used to perform the authentication (Uauth.pub). It uses this key to verify the authentication response. For example, it may use the public authentication key to decrypt or verify the signature generated over the nonce and any other related information (e.g., the transaction text, the transaction device ID, etc). If transaction confirmation is performed by the transaction device, then it may verify the transaction text displayed on the client by validating the signature generated over the transaction text and included in the authentication response at 528. Instead of having a cryptographically secured serverData structure, the transaction device could also verify unsigned serverData using an online connection to the relying party—if this is available (semi-offline case).

At 529, a success or failure indication is sent to the client depending on whether authentication was successful or unsuccessful, respectively. If successful, the transaction device will permit the transaction (e.g., debiting/crediting an account to complete a purchase, dispensing cash, performing administrative task, etc). If not, it will disallow the transaction and/or request additional authentication.

At 530 the transaction device may transmit the authentication response to the relying party and/or the transaction text (assuming that the relying party is the entity responsible for verifying the transaction text). A record of the transaction may be recorded at the relying party and/or the relying party may verify the transaction text and confirm the transaction (not shown).

Figure 6:
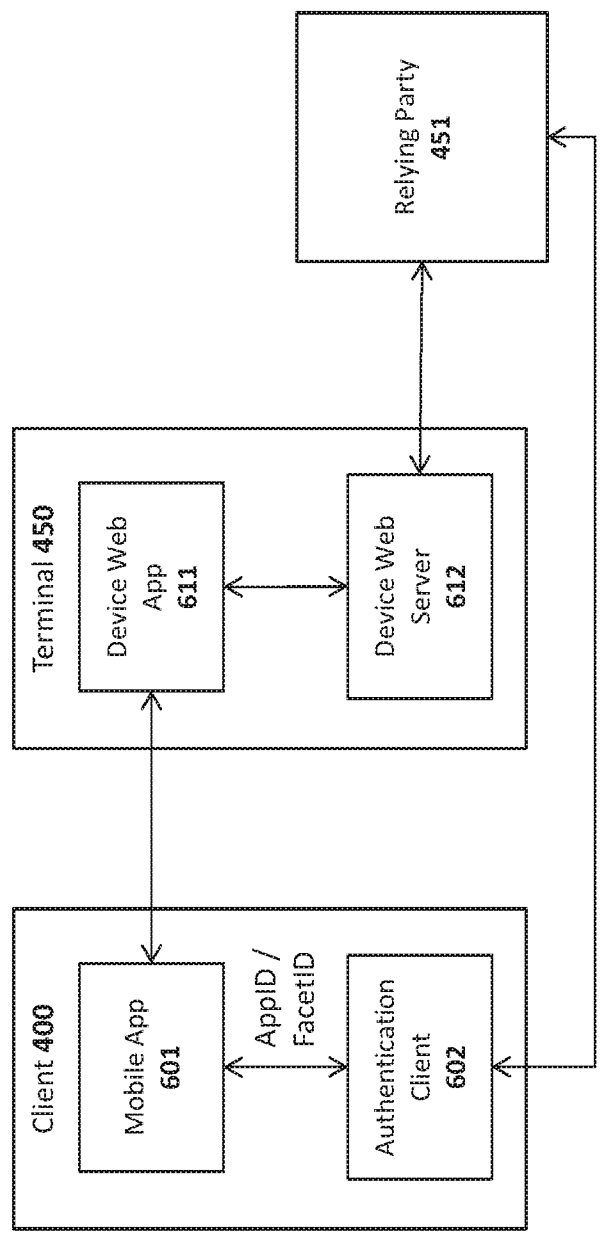
FIG. 6 illustrates additional architectural features employed in one embodiment of the invention.

As illustrated in FIG. 6, in one embodiment, a mobile app 601 is executed on the client to perform the operations described herein in combination with an authentication client 602 (which may be the secure transaction service 201 and interface 202 shown in FIG. 2B). In particular, the mobile app 601 may open a secure channel to a web app 611 executed on the transaction device 450 using transport layer security (TLS) or other secure communication protocol. A web server 612 on the transaction device may also open a secure channel to communicate with the relying party 451 (e.g., to retrieve authentication requests and/or to provide updates to the relying party 451 as discussed above). The authentication client 602 may communicate directly with the relying party 451 to, for example, retrieve cacheable authentication requests (as discussed in detail above).

In one embodiment, the authentication client 602 may identify the relying party and any authorized Mobile Apps 601 with an "AppID" which is a unique code associated with each application made available by a relying party. In some embodiments, where a relying party offers multiple online services, a user may have multiple AppIDs with a single relying party (one for each service offered by the relying party).

In one embodiment, any application identified by an AppID may have multiple "facets" which identify the allowable mechanisms and/or application types for connecting with the relying party. For example, a particular relying party may allow access via a Web service and via different platform-specific mobile apps (e.g., an Android App, an iOS App, etc). Each of these may be identified using a different "FacetID" which may be provided by the relying party to the authentication engine as illustrated.

In one embodiment, the calling mobile app 601 passes its AppID to the API exposed by the authentication client 602. On each platform, the authentication client 602 identifies the calling app 601, and determines its FacetID. It then resolves the AppID and checks whether the FacetID is included in a TrustedApps list provided by the relying party 451.

Figure 7:
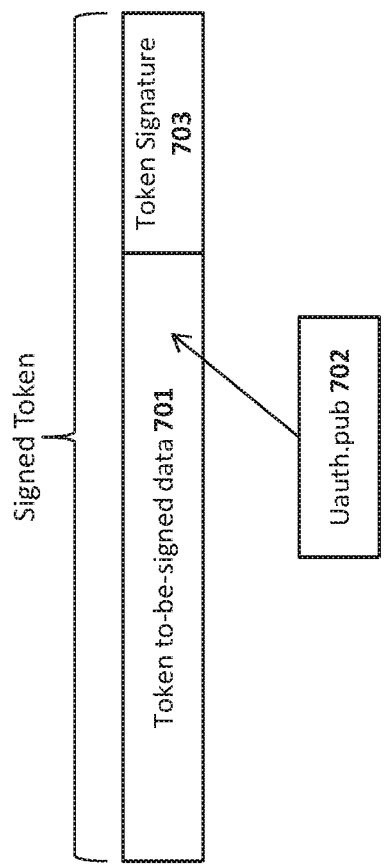
FIGS. 7-8 illustrate different embodiments of bearer tokens employed in different embodiments of the invention.
Figure 8:
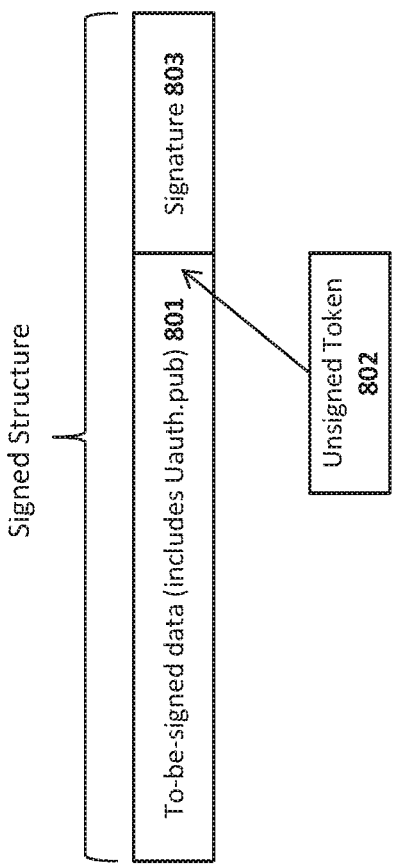

In one embodiment, the cacheable authentication requests discussed above may be implemented using bearer tokens such as illustrated in FIGS. 7 and 8. In the embodiments of the invention described herein, the token recipient (the transaction device 450), needs to be able to verify the token, the authentication response and the binding of the token to the authentication response without requiring another "online" connection to the token issuer (the relying party).

Two classes of bearer tokens should be distinguished:

1. Tokens which can only be verified by the recipient (e.g., the transaction device 450) using a different channel to the issuer (e.g., the relying party 451), that must exist between the token issuance and the token verification. This class of tokens is referred to herein as "unsigned tokens."

2. Tokens which can be verified by the recipient due to their cryptographic structure, e.g., because they contain a digital signature which can be verified using data received from the token issuer, potentially way before the specific token was issued. This class of tokens is referred to herein as "signed tokens".

The term "signed token structure" Is used herein to refer to both the signed token including the Uauth.pub key and the signed structure containing the token.

Binding Signed Tokens to Authentication Keys

As illustrated in FIG. 7, in one embodiment, in order to bind signed tokens to the Authentication Key, the token issuer (e.g., the relying party 451): (a) adds the Authentication public key (Uauth.pub) 702 to the to-be-signed portion 701 of the (to-be-) signed token; and (b) includes that signed token in the to-be-signed portion of the authentication response. By doing this, the token recipient (e.g., the transaction device 450) can verify the token by validating the signature 703 (e.g., the public RPVerifyKey discussed above). If the verification succeeds, it can extract the public key (Uauth.pub) and use it to verify the authentication response, as previously discussed.

Binding Unsigned Tokens to Authentication Keys

As illustrated in FIG. 8, in order to bind unsigned tokens 802 to the Authentication Key, in one embodiment, the token issuer (e.g., the relying party 451) creates a signed structure covering (at least) the original token 802 and to-be-signed data 801 which includes the authentication public key (Uauth.pub). The signed structure can be verified by validating the signature 803 using the public key related to the private signing key (e.g., the RPVerifyKey pair discussed above). This public signing key needs to be shared with the token recipient (e.g., the transaction device 450). Sharing can be done once after generation of the signing key pair, potentially way before the first signed structure was generated.

The techniques described herein support both the "full-offline" implementation (i.e., the transaction device 450 has no connection to the relying party 451 at the time of the transaction) as well as the "semi-offline" implementation (i.e., the transaction device has a connection to the relying party 451 at the time of the transaction, but the client does not.

Even in the full-offline case, the transaction device 450 is still expected to be connected via a host from time to time to the relying party 451. For example, the host may collect all responses stored in the transaction device 450 in order to send them to the relying party and may also update (if required) the list of revoked Uauth keys (e.g., the public authentication keys which have been revoked since the last connection).

Some embodiments also support pure (session) authentication as well as transaction confirmation. Even in the case of transaction confirmation, the relying party 451 can verify the transaction, if the transaction device 450 submits the transaction text along with the authentication response to the relying party 451.

There several different use cases/applications for the techniques described herein. For example:

1. Payment. A user has registered his authenticator (e.g. a smartphone) with a payment service provider (PSP). The user wants to authenticate a payment at some merchant using a Point-of-Sale device (PoS) authorized by the PSP, but the PoS doesn't have a reliable and permanent online connection to the PSP (e.g. located in a Bus). In this example, the PoS may be implemented as the transaction device 450 and the PSP may be implemented as the relying party 451 described above to allow the transaction notwithstanding the lack of a reliable and permanent connection.

2. Internet-of-Things. A company has installed several embedded devices (e.g. in a factory, building, etc.). Maintenance of such devices is performed by a technicians employed by a contracted party. For performing the maintenance the technician has to authenticate to the device in order to prove his eligibility for the task. The following assumptions are made (based on realistic frame conditions):

a. The technician cannot perform registration with each of such devices (as there are too many of them).

b. There are too many technicians and too much fluctuation of such technicians in order to keep the list of eligible technicians up-to-date on each of the devices.

c. Neither the device nor the technician's computer has a reliable network connection at the time of maintenance.

Using the techniques described above, the company can inject a trust anchor (e.g., the public RPVerifyKey) into all devices once (e.g., at installation time). Each technician then registers with the contracted party (e.g., the relying party 451 which may be the technician's employer). Using the above techniques, the technician will be able to authenticate to each device.

The embodiments of the invention described above may be implemented in any system in which a client with authentication capabilities is registered with a relying party and the authentication operation is performed between this client and a device (a) acting on behalf of the relying party and (b) being offline (i.e. not having a reliable network connection to the relying party's original server the client has been registered with) at the time of transaction. In such a case, the client receives a cacheable authentication request from the original server and caches it. Once it is required, the client computes the authentication response and sends it to the device.

In another embodiment, the client adds channel binding data (received in the authentication request) to the response in a cryptographically secure way. By doing this, the relying party's original server can verify that the request was received by a legitimate client (and not some man-in-the-middle).

In one embodiment, the relying party adds additional authenticated data to the response such as the Uauth.pub key which allows the device to verify the authentication or transaction confirmation response, without having to contact the relying party server for retrieving the approved Uauth.pub key. In another embodiment, the relying party requires the user of the client to perform a successful authentication before issuing the "cacheable" authentication requests (in order to prevent denial of service attacks). In one embodiment, the relying party requires the client to indicate whether a request needs to be cacheable or not. If cacheable, the relying party may require additional authentication data in the response (e.g., the MaxCacheTime discussed above).

In one embodiment, a device such as the transaction device 450 does not have a direct network connection to the relying party and is "synchronized" to the relying party using a separate computer (sometimes referred to herein as the "host"). This host retrieves all collected authentication responses from the device and transfers them to the relying party. Additionally the host may also copy a list of revoked Uauth keys to the device to ensure that one of the revoked keys is not used in an authentication response.

In one embodiment, a device such as the transaction device 450 sends a random value (e.g., nonce) to the client and the client cryptographically adds this random value as an extension to the authentication response before signing it. This signed random value serves as a freshness proof to the device.

In one embodiment, the client's authenticator adds the current time Ta as an extension to the authentication response before signing it. The device/transaction device may compare that time to the current time Td and only accept the response if the difference between Ta and Td is acceptable (e.g., if the difference is less than two minutes (abs(Td-Ta)<2 min)).

In one embodiment, the relying party adds an authenticated (i.e., signed) expiration time to the cacheable request. As discussed above, the device/transaction device will only accept the response as valid if it is received before the expiration time.

In one embodiment, the relying party adds an authenticated (i.e., signed) data block (e.g., the "signed token structure" mentioned above) including additional information such as (but not limited to) public key, expiration time, maximum transaction value (e.g., Security Assertion Markup Language (SAML) assertions, OAuth tokens, JSON Web Signature (JWS) objects, etc) to the cacheable request. The device/transaction device may only accept the response as valid if the signed data block can be positively verified and the contents are acceptable.

In one embodiment, the relying party only adds the unsigned token to the cacheable authentication request, but the transaction device has an online connection to the relying party at the time of transaction. The transaction device verifies the authenticity of the unsigned token using the online connection to the relying party at the time of transaction.

Figure 9:
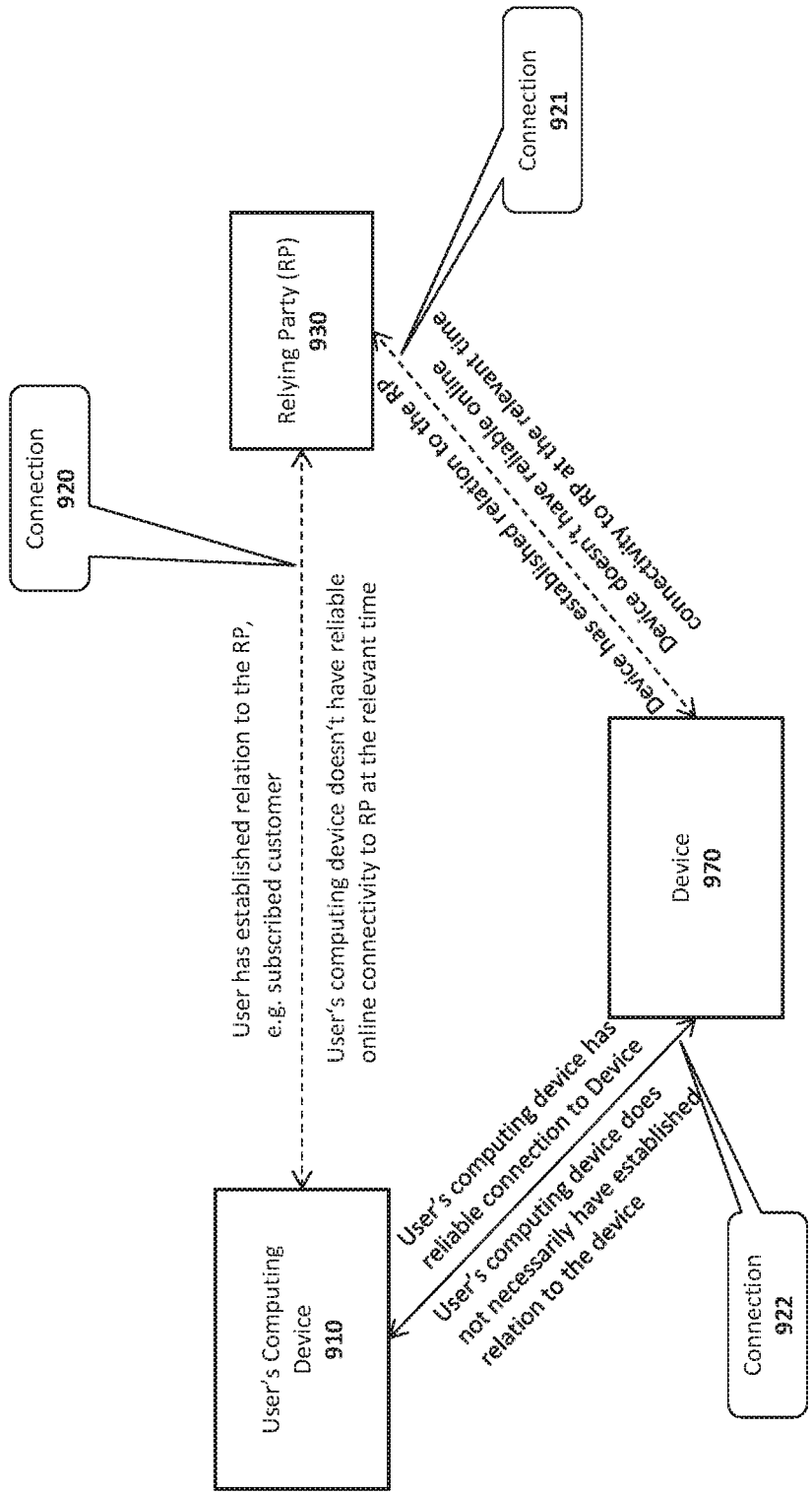
FIG. 9 illustrates exemplary "offline" and "semi-offline" authentication scenarios.

FIG. 9 illustrates exemplary "offline" and "semi-offline" authentication scenarios in accordance with one embodiment of the invention. In this embodiment, the user with a computing device 910 has an established relation to the relying party 930 and could authenticate to the relying party. However, in some circumstances, the user wants to perform a transaction (e.g., an authentication of a transaction confirmation) with a device 970 which has an established relation to the relying party 930 but not necessarily one to the user's computing device 910. With respect to this embodiment, the transaction is referred to as "full offline" if the connection 920 and connection 921 do not exist or are not stable at the relevant time (e.g., the time of authentication of the user's computing device 910 to the device 970 or of the transaction between the user's computing device 910 and the device 970). With respect to this embodiment, the transaction is "semi-offline" if the connection 920 between the user's computing device 910 and the relying party 930 is not stable, but the connection 921 between the device 970 and the relying party 930 is stable. Note that in this embodiment, connection 922 between the user's computing device 910 and device 970 is required to be stable at the relevant time. It is also expected that the Authenticator to be connected to the user's computing device 910. The connection 922 could be implemented using any type of communication channels/protocols including, but not limited to, Bluetooth, Bluetooth low energy (BTLE), near field communication (NFC), Wifi, Global System for Mobile Communications (GSM), Universal Mobile Telecommunications System (UTMS), Long-Term Evolution (LTE) (e.g., 4G LTE), and TCP/IP.

Exemplary Data Processing Devices

Figure 10:
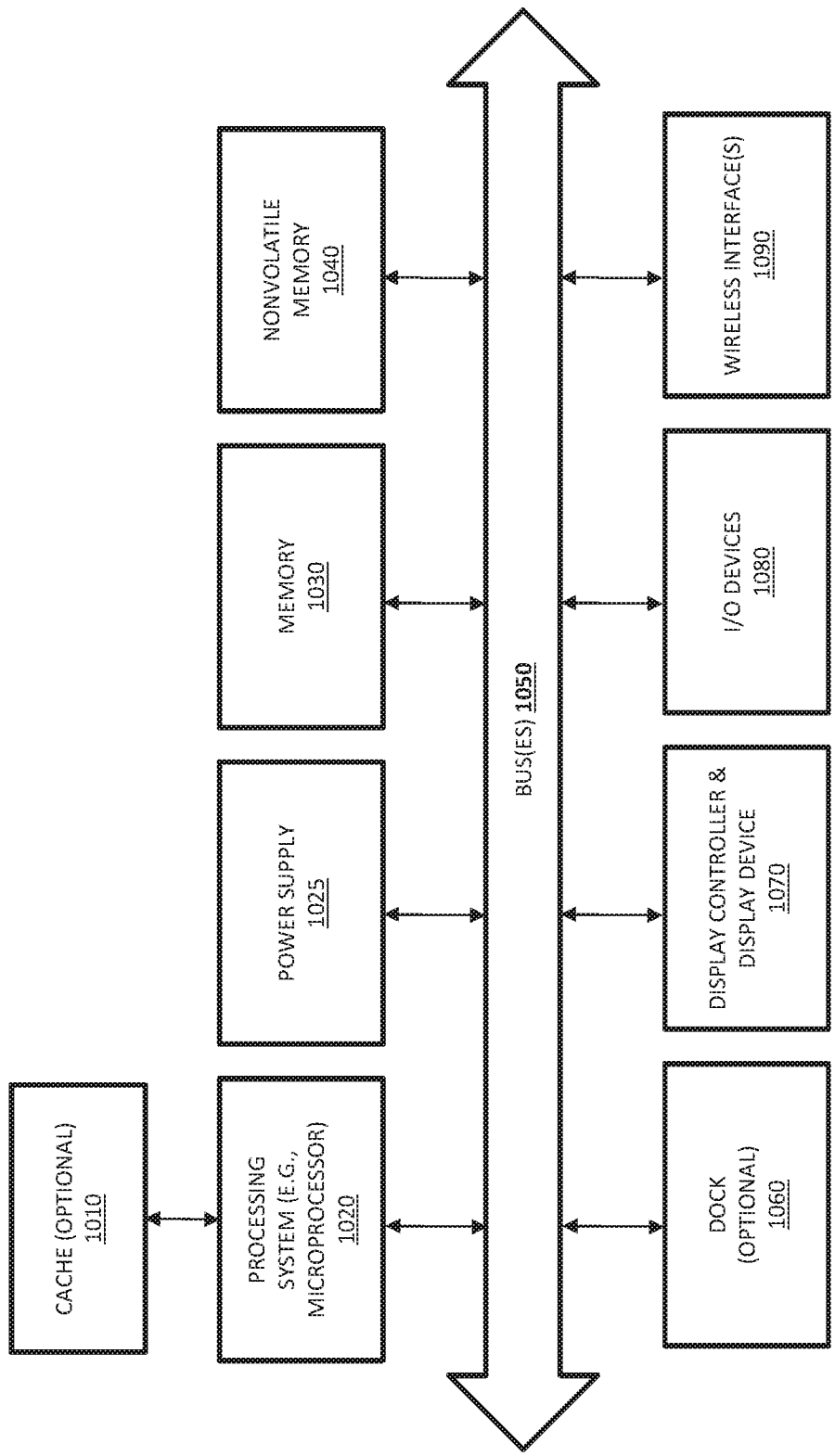
FIG. 10 illustrates an exemplary system architecture for clients and/or servers.

FIG. 10 is a block diagram illustrating an exemplary clients and servers which may be used in some embodiments of the invention. It should be understood that while FIG. 10 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 10, the computer system 1000, which is a form of a data processing system, includes the bus(es) 1050 which is coupled with the processing system 1020, power supply 1025, memory 1030, and the nonvolatile memory 1040 (e.g., a hard drive, flash memory, Phase-Change Memory (PCM), etc.). The bus(es) 1050 may be connected to each other through various bridges, controllers, and/or adapters as is well known in the art. The processing system 1020 may retrieve instruction(s) from the memory 1030 and/or the nonvolatile memory 1040, and execute the instructions to perform operations as described above. The bus 1050 interconnects the above components together and also interconnects those components to the optional dock 1060, the display controller & display device 1070, Input/Output devices 1080 (e.g., NIC (Network Interface Card), a cursor control (e.g., mouse, touchscreen, touchpad, etc.), a keyboard, etc.), and the optional wireless transceiver(s) 1090 (e.g., Bluetooth, WiFi, Infrared, etc.).

Figure 11:
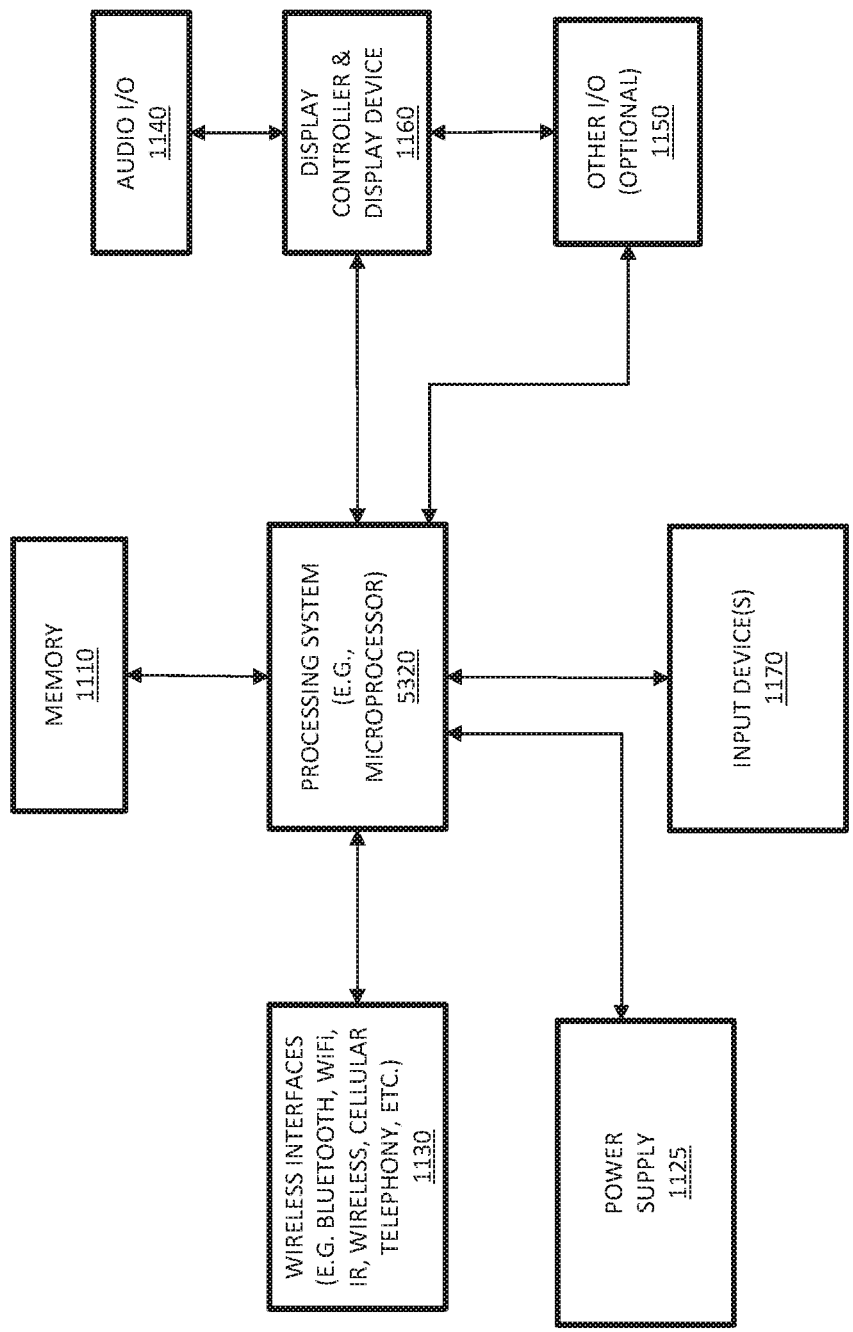
FIG. 11 illustrates another exemplary system architecture for clients and/or servers.

FIG. 11 is a block diagram illustrating an exemplary data processing system which may be used in some embodiments of the invention. For example, the data processing system 190 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1100 may be a network computer or an embedded processing device within another device.

According to one embodiment of the invention, the exemplary architecture of the data processing system 1100 may be used for the mobile devices described above. The data processing system 1100 includes the processing system 1120, which may include one or more microprocessors and/or a system on an integrated circuit. The processing system 1120 is coupled with a memory 1110, a power supply 1125 (which includes one or more batteries) an audio input/output 1140, a display controller and display device 1160, optional input/output 1150, input device(s) 1170, and wireless transceiver(s) 1130. It will be appreciated that additional components, not shown in FIG. 11, may also be a part of the data processing system 1100 in certain embodiments of the invention, and in certain embodiments of the invention fewer components than shown in FIG. 11 may be used. In addition, it will be appreciated that one or more buses, not shown in FIG. 11, may be used to interconnect the various components as is well known in the art.

The memory 1110 may store data and/or programs for execution by the data processing system 1100. The audio input/output 1140 may include a microphone and/or a speaker to, for example, play music and/or provide telephony functionality through the speaker and microphone. The display controller and display device 1160 may include a graphical user interface (GUI). The wireless (e.g., RF) transceivers 1130 (e.g., a WiFi transceiver, an infrared transceiver, a Bluetooth transceiver, a wireless cellular telephony transceiver, etc.) may be used to communicate with other data processing systems. The one or more input devices 1170 allow a user to provide input to the system. These input devices may be a keypad, keyboard, touch panel, multi touch panel, etc. The optional other input/output 1150 may be a connector for a dock.

Apparatus and Method for Efficient Challenge-Response Authentication

Figure 12:
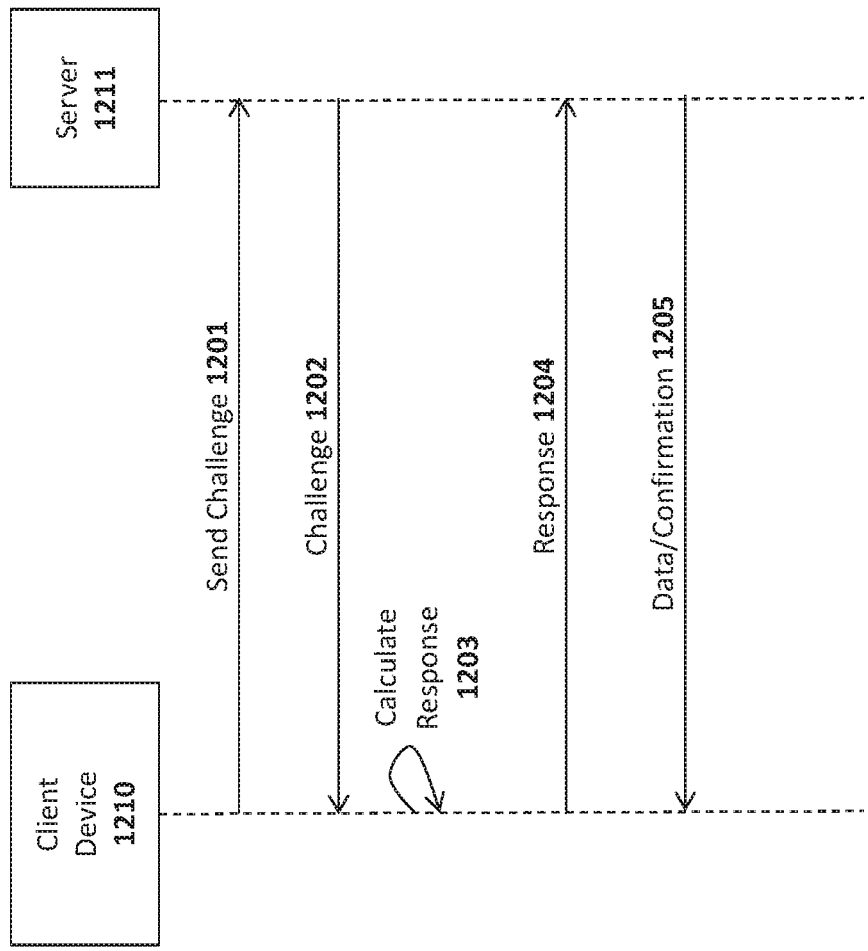
FIG. 12 illustrates an example of a challenge-response authentication protocol and system.

Challenge-response protocols with cryptographic signatures in the response are state-of-the-art for authentication (e.g., such as specified in the current FIDO Protocols), transaction confirmation (e.g., such as Android Protected Confirmation) and other security purposes (see, e.g., SafetyNet). As illustrated in FIG. 12, the client device 1210 typically asks the server 1211 (at 1201) to generate and remember a random challenge and send that challenge over to the client (at 1202). The client calculates a response 1203 comprising a signature generated using the challenge 1202. The client transmits this response 1204 including the signature to the server 1211 which must verify and transmit a confirmation 1205 if successful (i.e., if the signature was validated). The server 1211 will only accept responses related to a challenge 1202 the server has stored for subsequent use. The reason for this approach is that there is a need to protect against replay attacks, i.e., attacks in which some entity could just capture a response and replay it in order to be authenticated. Unfortunately, this requires one additional communication roundtrip.

The server 1211 verifies the freshness of the challenge in the response 1204 (i.e., verifies whether the server still has a copy of that challenge and verifies the age of the challenge) in order to ensure it is not a replay attack.

While communication is typically quite fast, the round trip still takes significant time. Consequently, reducing the time for one of the two roundtrips would significantly improve the speed of these operations.

Figure 13:
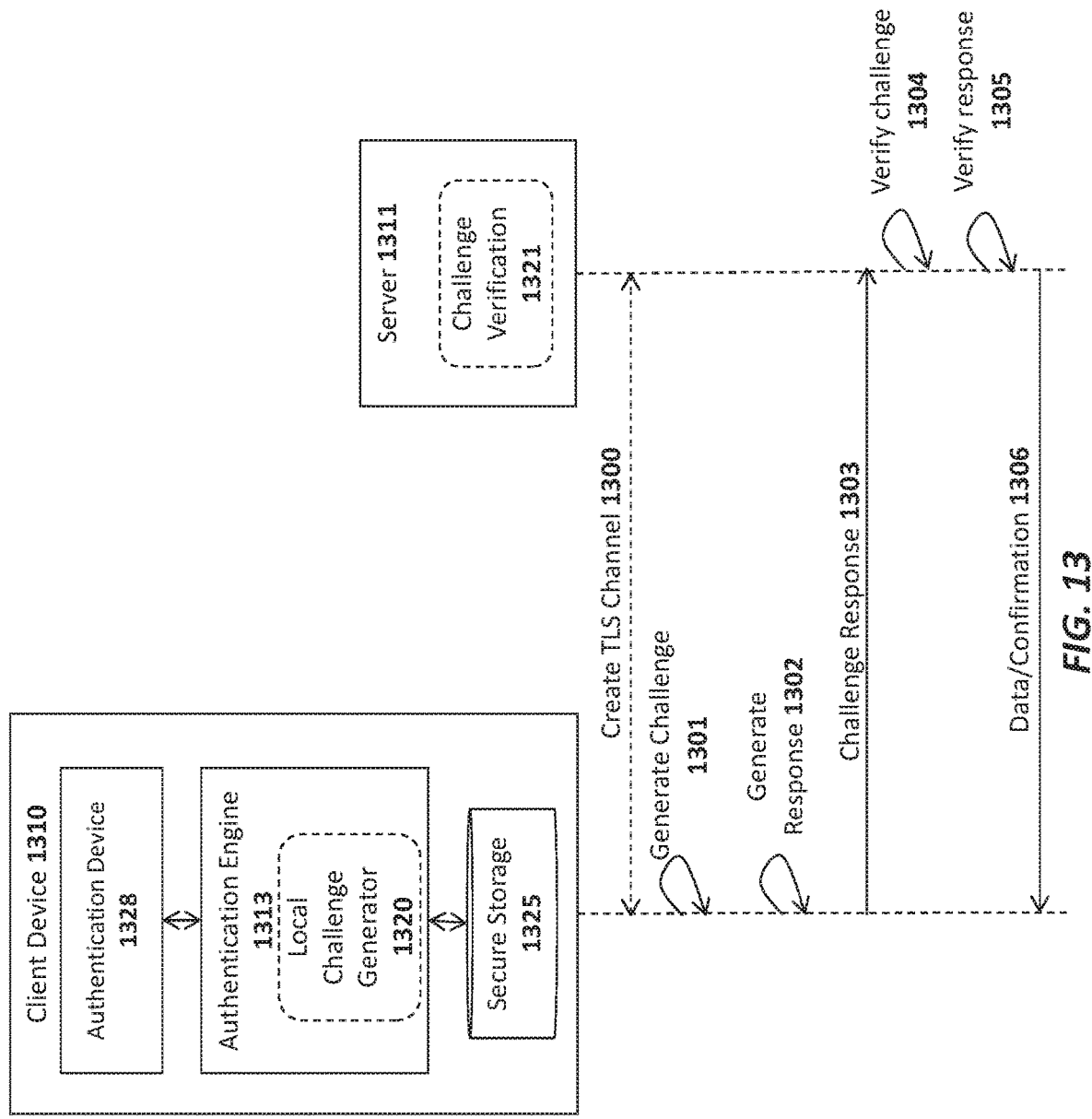
FIG. 13 illustrates one embodiment in which a client device locally generates a challenge.

To address this limitation, one embodiment of the invention generates a challenge locally in a predetermined manner, thereby avoiding the client-to-server request for a challenge and the subsequent server. FIG. 13 illustrates one particular embodiment in which the client device 1310 and server 1311 may initially establish a TLS (Transport Layer Security) channel at 1300. The authentication engine 1313 of the client device 1310 includes a local challenge generator 1320 which locally generates the challenge at 1301. Once generated, the authentication engine 1313 generates a challenge response 1302 including a signature over the challenge. The challenge response is transmitted at 1303 and challenge verification logic/circuitry 1321 on the server 1311 verifies the challenge at 1304 and verifies the response at 1305. The server 1311 retains the challenge and AppID for a specified duration as described below (e.g., until server-now>app-now+X+more). In one embodiment, the challenge verification logic/circuitry 1321 performs the verification at 1304-1305 by independently generating the challenge and signature and/or comparing the signature and/or challenge to the one received from the client device 1310. If verification is successful, the server 1311 transmits a confirmation at 1306.

With this approach the need for an additional round-trip is removed while still preserving the replay attack protection characteristics of the protocol. In one specific implementation, the following operations are performed, with the assumption that client 1310 and server 1311 have access to the same "defined-prefix".

The challenge is generated at 1301 and/or 1304 as c=derivationfunction(defined-prefix,current-time) using a key derivation function. In one embodiment the key derivation function comprises Argon 2 with a set of pre-defined parameters such as salt (for password hashing), degree of parallelism, desired number of returned bytes, amount of memory to use, number of iterations to perform, version number, and/or key. In another embodiment, the key derivation function comprises Password-Based Key Derivation Function 2 (pbkdf2); however, any similar function may be employed. One purpose of this function is to make it time-consuming to generate the result c for many different inputs (define-prefix and current-time).

The response is calculated at 1302 as defined by the underlying challenge-response protocol. Various different challenge-response protocol may be used including, but not limited to, FIDO, SafetyNet, and Android Protected Confirmation.

The challenge response is transmitted at 1303 which includes the "current-time" to the server 1311. The server verifies that the "current-time" is inside a specified acceptance window and stores the value "c" until this window is exceeded. This means that the server 1311 will reject responses that indicate they have been generated more than a threshold amount of time in the past (e.g., more than 60 seconds, 90 seconds, 120 seconds, etc) or that indicate having been generated too far in the future (e.g., more than 10 seconds).

Figure 14:
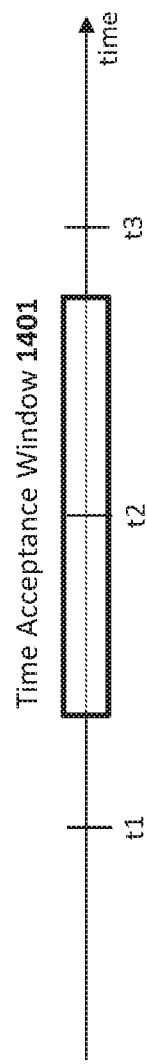
FIG. 14 illustrates an embodiment of a time acceptance window.

An example time acceptance window 1401 is illustrated in FIG. 14. The acceptance window is selected to be large enough to allow for clock-skew (i.e., inaccuracies between client-side and server-side notion of the time) but is still small enough to allow the server to remember all values "c" that appeared in a correctly signed response. In one embodiment, the server 1311 will also reject responses containing an already known value "c" that are signed by the same cryptographic key (as the original value "c"). If acceptable, the server 1311 returns the requested data or sends a confirmation of the intended operation at 1305.

By way of example, in FIG. 14, t1 is too early and hence considered outside of that window; this response would not be accepted. Time t2 is well inside the acceptance window; this response will be accepted if the related challenge is not already remembered by the server. Time t3 is too late and hence considered outside of that window; the response is not accepted.

Thus, one embodiment of the invention implements a cryptographic challenge-response protocol, where a local challenge generator 1320 generates a challenge and a cryptographic signature over the challenge using a private key (e.g., stored in a secure storage 1325) and where the related public key is known to the challenge verification circuitry/logic 1321 on the server 1311. The challenge verification circuitry/logic 1321 uses the public key to validate the cryptographic signature and rejects all responses which do not have a valid cryptographic signature. In one embodiment, the challenge c is generated by the local challenge generator 1320 using a key derivation function and the server verifies whether challenge c is "fresh" based on a verification that the input data to generate the challenge is acceptable (e.g., the dynamic-input-data is acceptable and the defined-prefix is the expected one). The server 1311 retains all used challenges related to the respective cryptographic public key for a defined time in order to prevent replay attacks.

In one implementation, the dynamic-input-data to the key derivation function is the current-time as known to the client device 1310 and where the challenge verification circuitry/logic 1321 determines the dynamic-input-data to be acceptable inside an acceptance-window. Alternatively, or in addition, the dynamic-input-data may be data that was exchanged previously such as unique data generated as part of the establishment of the TLS session 1300.

The key derivation function used may be Argon2, pbkdf2 or some other password hashing function. The key derivation function may also comprise a hash function such as SHA256 and SHA-3. In addition, the define-prefix variable may include a FIDO AppID/RpId.

The challenge-response protocol may include any type of challenge-response protocol including a FIDO registration/makeCredential operation, a FIDO authentication/getAssertion operation, a Google SafetyNet protocol, or a Android Protected Confirmation.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A system comprising:
a local challenge generator of a client apparatus to generate a challenge on a client device using a derivation function; and
an authentication engine of the client apparatus to generate a challenge response as defined by a specified challenge-response protocol,
the authentication engine to transmit the challenge and the challenge response to a server, and the server to validate the challenge response, at least in part, by determining whether the challenge was generated within a specified time window.

2. The system of claim 1 wherein the authentication engine is to generate the challenge response by generating a cryptographic signature over the challenge with a private key and wherein the server is to validate the challenge response using a corresponding public key, the server to reject any response with an invalid cryptographic signature.

3. The system of claim 1 wherein the challenge is generated using a key derivation function comprising a defined-prefix and dynamic-input-data as inputs, wherein the server knows or is configured to reproduce the defined-prefix and dynamic-input-data inputs.

4. The system of claim 3 wherein the dynamic-input-data comprises a time usable by the server to determine whether the challenge was generated within the specified time window.

5. The system of claim 4 wherein the server is to retain all used challenges related to a respective cryptographic public key for a defined time in order to prevent replay attacks.

6. The system of claim 4, wherein dynamic-input-data comprises a current time as known to the client apparatus and wherein the server determines the dynamic-input-data to be acceptable if the current time is within an acceptance window.

7. A system of claim 3, wherein dynamic-input-data comprises data exchanged previously between the client apparatus and server.

8. The system of claim 7 wherein the data exchanged previously comprises data exchanged to establish a transport layer security (TLS) session between the client apparatus and the server.

9. The system of claim 1 wherein the derivation function comprises an Argon2 key derivation function or a pbkdf2 key derivation function.

10. The system of claim 1 wherein the derivation function comprises a hash function.

11. The system of claim 3 wherein the challenge response protocol comprises a Fast Identify Online (FIDO) registration/makeCredential operation, a FIDO authentication/getAssertion operation, a SafetyNet protocol, or an Android Protected Confirmation protocol.

12. The system of claim 11 wherein the defined-prefix includes a FIDO AppID or RpId.

13. A non-transitory machine-readable medium having program code stored thereon which, when executed by a machine, causes the machine to perform operations of:
generating a challenge on a client apparatus using a derivation function;
generating a challenge response on the client apparatus as defined by a specified challenge-response protocol; and
transmitting the challenge and the challenge response from the client apparatus to a server, and the server to validate the challenge response, at least in part, by determining whether the challenge was generated within a specified time window.

14. The machine-readable medium of claim 13 wherein the challenge response is generated by generating a cryptographic signature over the challenge with a private key and wherein the server is to validate the challenge response using a corresponding public key, the server to reject any response with an invalid cryptographic signature.

15. The machine-readable medium of claim 13 wherein the challenge is generated using a key derivation function comprising a defined-prefix and dynamic-input-data as inputs, wherein the server knows or is configured to reproduce the defined-prefix and dynamic-input-data inputs.

16. The machine-readable medium of claim 15 wherein the dynamic-input-data comprises a time usable by the server to determine whether the challenge was generated within the specified time window.

17. The machine-readable medium of claim 16 wherein the server is to retain all used challenges related to a respective cryptographic public key for a defined time in order to prevent replay attacks.

18. The machine-readable medium of claim 16, wherein dynamic-input-data comprises a current time as known to the client apparatus and wherein the server determines the dynamic-input-data to be acceptable if the current time is within an acceptance window.

19. A machine-readable medium of claim 15, wherein dynamic-input-data comprises data exchanged previously between the client apparatus and server.

20. The machine-readable medium of claim 19 wherein the data exchanged previously comprises data exchanged to establish a transport layer security (TLS) session between the client apparatus and the server.

21. The machine-readable medium of claim 13 wherein the derivation function comprises an Argon2 key derivation function or a pbkdf2 key derivation function.

22. The machine-readable medium of claim 13 wherein the derivation function comprises a hash function.

23. The machine-readable medium of claim 15 wherein the challenge response protocol comprises a Fast Identify Online (FIDO) registration/makeCredential operation, a FIDO authentication/getAssertion operation, a SafetyNet protocol, or an Android Protected Confirmation protocol.

24. The machine-readable medium of claim 23 wherein the defined-prefix includes a FIDO AppID or RpId.

25. A method comprising:
generating a challenge on a client apparatus using a derivation function;
generating a challenge response on the client apparatus as defined by a specified challenge-response protocol; and
transmitting the challenge and the challenge response from the client apparatus to a server, and the server to validate the challenge response, at least in part, by determining whether the challenge was generated within a specified time window.

* * * * *